(12) United States Patent
Kashar

(10) Patent No.: US 10,600,291 B2
(45) Date of Patent: *Mar. 24, 2020

(54) SYSTEM AND METHOD FOR ALERTING A USER

(71) Applicant: Alexis Ander Kashar, Scarsdale, NY (US)

(72) Inventor: Alexis Ander Kashar, Scarsdale, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/048,544

(22) Filed: Aug. 27, 2018

(65) Prior Publication Data

US 2019/0012885 A1    Jan. 10, 2019

Related U.S. Application Data

(63) Continuation-in-part of application No. 14/252,216, filed on Apr. 14, 2014, now Pat. No. 10,274,908.

(Continued)

(51) Int. Cl.
| | | |
|---|---|---|
| *G08B 6/00* | (2006.01) | |
| *G08B 5/38* | (2006.01) | |
| *G06F 1/16* | (2006.01) | |
| *G08B 3/10* | (2006.01) | |
| *G08B 21/02* | (2006.01) | |

(Continued)

(52) U.S. Cl.
CPC ............ *G08B 6/00* (2013.01); *G06F 1/163* (2013.01); *G06F 1/1637* (2013.01); *G06F 3/016* (2013.01); *G08B 1/08* (2013.01); *G08B 3/10* (2013.01); *G08B 5/38* (2013.01); *G08B 21/02* (2013.01); *G09B 21/003* (2013.01); *G09B 21/009* (2013.01)

(58) Field of Classification Search
CPC combination set(s) only.
See application file for complete search history.

(56) References Cited

U.S. PATENT DOCUMENTS

| | | |
|---|---|---|
| 4,365,238 A | 12/1982 | Kollin |
| 4,853,674 A | 8/1989 | Kiss |

(Continued)

FOREIGN PATENT DOCUMENTS

| | | |
|---|---|---|
| CN | 1755557 A | 4/2006 |
| CN | 101069363 A | 11/2007 |

(Continued)

OTHER PUBLICATIONS

Office Action and Search Report from corresponding Chinese Application No. 201580013730.8, dated May 15, 2018.

(Continued)

*Primary Examiner* — Adnan Aziz
(74) *Attorney, Agent, or Firm* — James E. Walton

(57) ABSTRACT

The alarm monitoring system provides various alerts of events that are not readily discernable to those individuals that are deaf or hard of hearing. The system generates visual, vibratory, and high decibel alerts separately or in combination to alert the user to a wide variety of events in combination with a plurality of vibratory illuminating puck shaped devices or skin and clothing patches, smart bulbs, other IOT device and allows a user to filter out alerts based upon a variety of modifiers or conditions such as keyword filtering.

20 Claims, 12 Drawing Sheets

Related U.S. Application Data which is a continuation-in-part of application No. 14/153,411, filed on Jan. 13, 2014, now Pat. No. 9,852,656.

(51) Int. Cl.
*G09B 21/00* (2006.01)
*G06F 3/01* (2006.01)
*G08B 1/08* (2006.01)

(56) References Cited

U.S. PATENT DOCUMENTS

| | | |
|---|---|---|
| 5,251,253 A | 10/1993 | Chutuk |
| 5,651,070 A | 7/1997 | Blunt |
| 5,737,692 A | 4/1998 | Lang |
| 5,809,112 A | 9/1998 | Ryan |
| 5,867,105 A | 2/1999 | Hajel |
| 5,917,420 A | 6/1999 | Gonzalez |
| 6,118,375 A | 9/2000 | Duncan |
| 6,288,642 B1 | 9/2001 | Dohrmann |
| 6,369,312 B1 | 4/2002 | Komatsu |
| 6,381,472 B1 | 4/2002 | LaMedica, Jr. et al. |
| 6,384,724 B1 | 5/2002 | Landais |
| 6,624,750 B1 | 9/2003 | Marman |
| 6,831,974 B1 | 12/2004 | Watson et al. |
| 6,867,688 B2 | 3/2005 | Lamb |
| 6,950,019 B2 | 9/2005 | Bellone et al. |
| 6,980,088 B2 | 12/2005 | Stambaugh |
| 7,015,807 B2 | 3/2006 | Roby et al. |
| 7,042,338 B1 | 5/2006 | Weber |
| 7,129,833 B2 | 10/2006 | Albert |
| 7,148,797 B2 | 12/2006 | Albert |
| 7,170,397 B2 | 1/2007 | Roby et al. |
| 7,173,881 B1 | 2/2007 | Freudenberg, Jr. et al. |
| 7,227,463 B2 | 6/2007 | Merrell |
| 7,785,257 B2 | 8/2010 | Mack et al. |
| 7,965,196 B2 * | 6/2011 | Liebermann ............ G10L 15/26 340/4.11 |
| 7,996,046 B2 | 8/2011 | Vargas et al. |
| 8,115,091 B2 | 2/2012 | Brenner et al. |
| 8,203,444 B2 | 6/2012 | Strohallen et al. |
| 8,452,345 B2 | 5/2013 | Lee et al. |
| 8,489,065 B2 | 7/2013 | Green et al. |
| 8,780,201 B1 | 7/2014 | Scalisi et al. |
| 8,860,563 B2 | 10/2014 | Cruz-Hernandez et al. |
| 8,917,821 B2 | 12/2014 | Engelke et al. |
| 8,923,804 B1 | 12/2014 | Aldridge, II et al. |
| 9,304,736 B1 | 4/2016 | Whiteley et al. |
| 9,444,945 B1 * | 9/2016 | Verma ............ H04M 11/04 |
| 9,659,577 B1 | 5/2017 | Langhammer |
| 2002/0186618 A1 | 12/2002 | Kirkpatrick |
| 2003/0067882 A1 | 4/2003 | Leung |
| 2003/0117272 A1 | 6/2003 | Fegley et al. |
| 2004/0168565 A1 | 9/2004 | Nagao et al. |
| 2004/0219928 A1 | 11/2004 | Deeds |
| 2004/0222879 A1 | 11/2004 | Sawyer et al. |
| 2005/0125541 A1 | 6/2005 | Frank et al. |
| 2005/0152325 A1 | 7/2005 | Gonzales |
| 2006/0011042 A1 | 1/2006 | Brenner et al. |
| 2006/0067165 A1 | 3/2006 | Chan |
| 2006/0226973 A1 | 10/2006 | Catlin |
| 2006/0234193 A1 | 10/2006 | Sahashi |
| 2006/0276218 A1 | 12/2006 | Goris et al. |
| 2006/0285652 A1 | 12/2006 | McClelland et al. |
| 2007/0001825 A1 | 1/2007 | Roby |
| 2007/0200716 A1 | 8/2007 | Haase et al. |
| 2007/0216537 A1 | 9/2007 | Park |
| 2007/0229257 A1 | 10/2007 | Bliding et al. |
| 2007/0299374 A1 | 12/2007 | Gesotti et al. |
| 2008/0012716 A1 | 1/2008 | Saltzstein |
| 2008/0111677 A1 | 5/2008 | Kolz |
| 2008/0143517 A1 | 6/2008 | Goffin |
| 2008/0267361 A1 | 10/2008 | Dileo |
| 2009/0303031 A1 | 12/2009 | Strohallen et al. |
| 2009/0315488 A1 | 12/2009 | Shyu et al. |
| 2010/0039266 A1 | 2/2010 | Faris et al. |
| 2010/0060466 A1 | 3/2010 | Austin |
| 2010/0087138 A1 | 4/2010 | Hedstrom |
| 2010/0145167 A1 | 6/2010 | Im |
| 2010/0148942 A1 | 6/2010 | Oh et al. |
| 2010/0195447 A1 | 8/2010 | George |
| 2010/0330952 A1 | 12/2010 | Yeoman |
| 2011/0021147 A1 | 1/2011 | Tout |
| 2011/0069769 A1 | 3/2011 | Brunolli |
| 2011/0153197 A1 | 6/2011 | Song |
| 2011/0267196 A1 | 11/2011 | Hu et al. |
| 2012/0206237 A1 | 8/2012 | Lovegreen |
| 2012/0238319 A1 | 9/2012 | Lake |
| 2012/0280790 A1 | 11/2012 | Gerhardt et al. |
| 2012/0281057 A1 | 11/2012 | Couse |
| 2013/0040610 A1 | 2/2013 | Migicovsky et al. |
| 2013/0043988 A1 | 2/2013 | Bruno |
| 2013/0097038 A1 | 4/2013 | Potter et al. |
| 2013/0100017 A1 | 4/2013 | Papakipos et al. |
| 2013/0281169 A1 | 10/2013 | Coverstone et al. |
| 2014/0064528 A1 | 3/2014 | Flood et al. |
| 2014/0097953 A1 | 4/2014 | Jelveh et al. |
| 2014/0106677 A1 | 4/2014 | Altman |
| 2014/0108019 A1 | 4/2014 | Ehsani et al. |
| 2014/0172953 A1 | 6/2014 | Blanksteen |
| 2014/0197946 A1 | 7/2014 | Park et al. |
| 2014/0266571 A1 | 9/2014 | Sharma et al. |
| 2014/0266607 A1 * | 9/2014 | Olodort ............ G08B 6/00 340/7.6 |
| 2014/0313040 A1 | 10/2014 | Wright, Sr. |
| 2014/0366273 A1 | 12/2014 | Davis, II et al. |
| 2016/0058658 A1 * | 3/2016 | Borras ............ H04M 1/72527 601/46 |

FOREIGN PATENT DOCUMENTS

| | | |
|---|---|---|
| CN | 101610599 A | 12/2009 |
| EP | 2134069 A1 | 12/2009 |
| WO | 0070779 A1 | 11/2000 |
| WO | 2012167098 A1 | 12/2012 |

OTHER PUBLICATIONS

Anonymous: "Nationwide launch of emergency alert system NL-Alert," News Item, Government.nl, Nov. 8, 2012, www.government.nl, from URL:https://www.government.nl/latest/news/2012/11/08/nationwide-launch-of-emergency-alert-system-nl-alert.

Article 34 Amendments dated Sep. 18, 2015 from corresponding PCT App. No. PCT/US15/11080.

Amendment from corresponding U.S. Appl. No. 14/153,411 dated Jun. 3, 2016.

Office Action from corresponding U.S. Appl. No. 14/153,411 dated Jul. 28, 2016.

Amendment from corresponding U.S. Appl. No. 14/153,411 dated Jan. 30, 2017.

Office Action from corresponding U.S. Appl. No. 14/153,411 dated Jun. 2, 2017.

Amendment from corresponding U.S. Appl. No. 14/153,411 dated Aug. 2, 2017.

Notice of Allowance from corresponding U.S. Appl. No. 14/153,411 dated Aug. 24, 2017.

Office Action from corresponding U.S. Appl. No. 14/252,216 dated Aug. 11, 2016.

Amendment from corresponding U.S. Appl. No. 14/252,216 dated Nov. 14, 2016.

Office Action from corresponding U.S. Appl. No. 14/252,216 dated Dec. 16, 2016.

Amendment from corresponding U.S. Appl. No. 14/252,216 dated Feb. 16, 2017.

Office Action from corresponding U.S. Appl. No. 14/252,216 dated Nov. 16, 2017.

Amendment from corresponding U.S. Appl. No. 14/252,216 dated Feb. 16, 2018.

Office Action from corresponding U.S. Appl. No. 14/252,216 dated Jun. 14, 2018.

(56) References Cited

OTHER PUBLICATIONS

Office Action from corresponding U.S. Appl. No. 15/088,669 dated Jul. 29, 2016.
Amendment from corresponding U.S. Appl. No. 15/088,669 dated Oct. 31, 2016.
Office Action from corresponding U.S. Appl. No. 15/088,669 dated Dec. 8, 2016.
Amendment from corresponding U.S. Appl. No. 15/088,669 dated Dec. 14, 2016.
Notice of Allowance from corresponding U.S. Appl. No. 15/088,669 dated Feb. 13, 2017.
Ethan, Seth, and Jeff; "Baboomi: A Customizable and Comfortable Alarm";https://www.kickstarter.com/projects/215279222/baboomi-a-customizable-and-comfortable-alarm?ref=live; Sep. 27, 2013; 18 pages.
Greg Livadas; "Waking up may soon be a lot easier for deaf and hard-of-hearing individuals RIT/NTID students win $5,000 in 'The Next Big Id' innovation competition";http://www.rit.edu/news/story.php?id=50770#.U207Cd_fK9A.facebook; May 9, 2014; 2 pages.
Greg Livadas; "Sonic-connect™ USB Media Alert—On Sale Now"; http://www.chs.ca/products/sonic-connecttm-usb-media-alert; Apr. 29, 2014; 2 pages.
International Search Report and Written Opinion of the International Searching Authority dated Jul. 16, 2015 from corresponding PCT App. No. PCT/US15/11080.
International Preliminary Report on Patentability dated Nov. 9, 2015 from corresponding PCT App. No. PCT/US15/11080.
Patty Singer; "RIT students develop alarm clock for the deaf"; http://www.democratandchronicle.com/story/news/2014/05/24/rit-students-develop-alarm-clock-deaf/9547301/; 3 pages.
Office Action from corresponding U.S. Appl. No. 14/153,411 dated Aug. 26, 2015.
Final Office Action from corresponding U.S. Appl. No. 14/153,411 dated Mar. 11, 2016.
Amendment from corresponding U.S. Appl. No. 14/153,411 dated Nov. 27, 2015.
Supplementary European Search Report from corresponding European Application No. 15735482 dated Apr. 3, 2018.

* cited by examiner

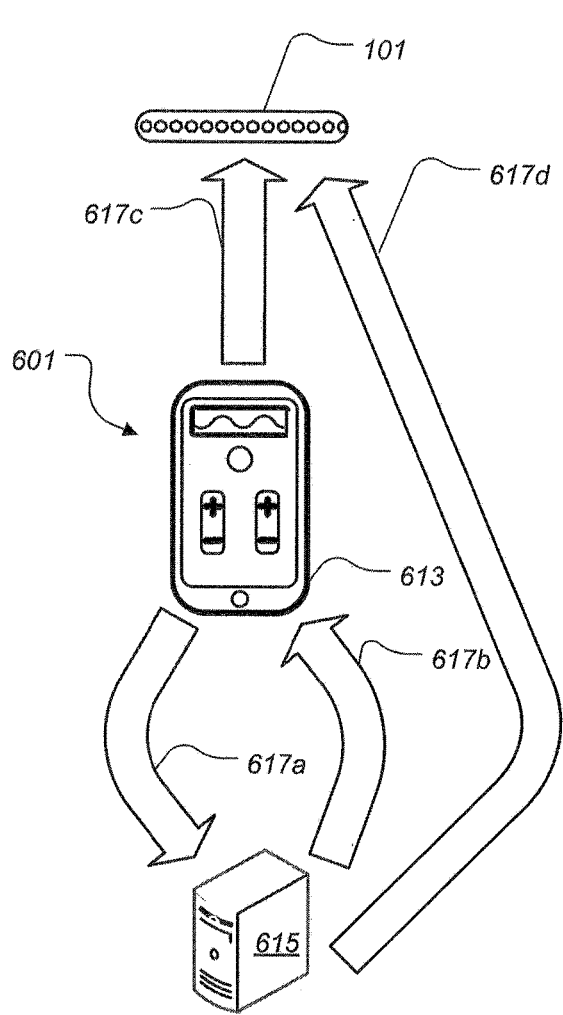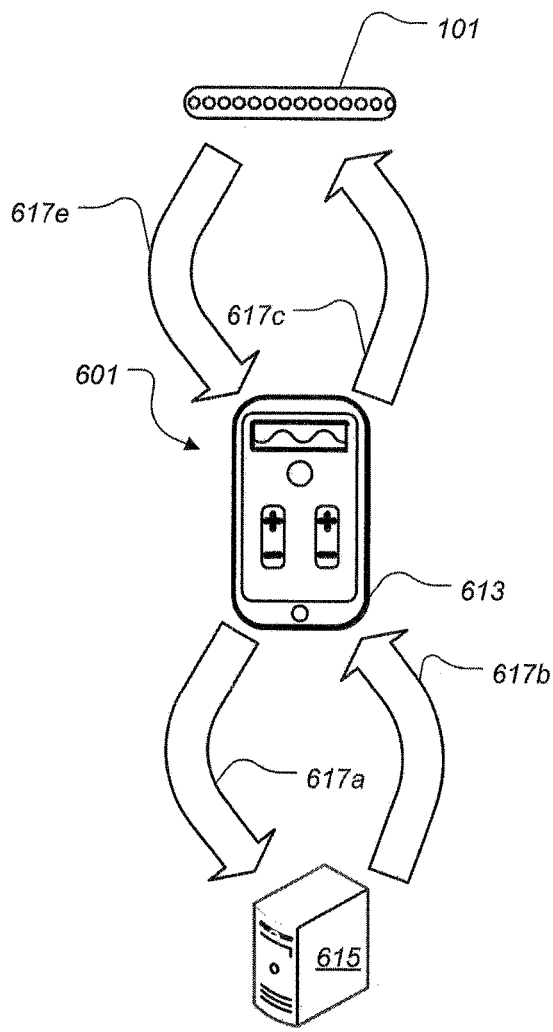
FIG. 6A　　　　　FIG. 6B

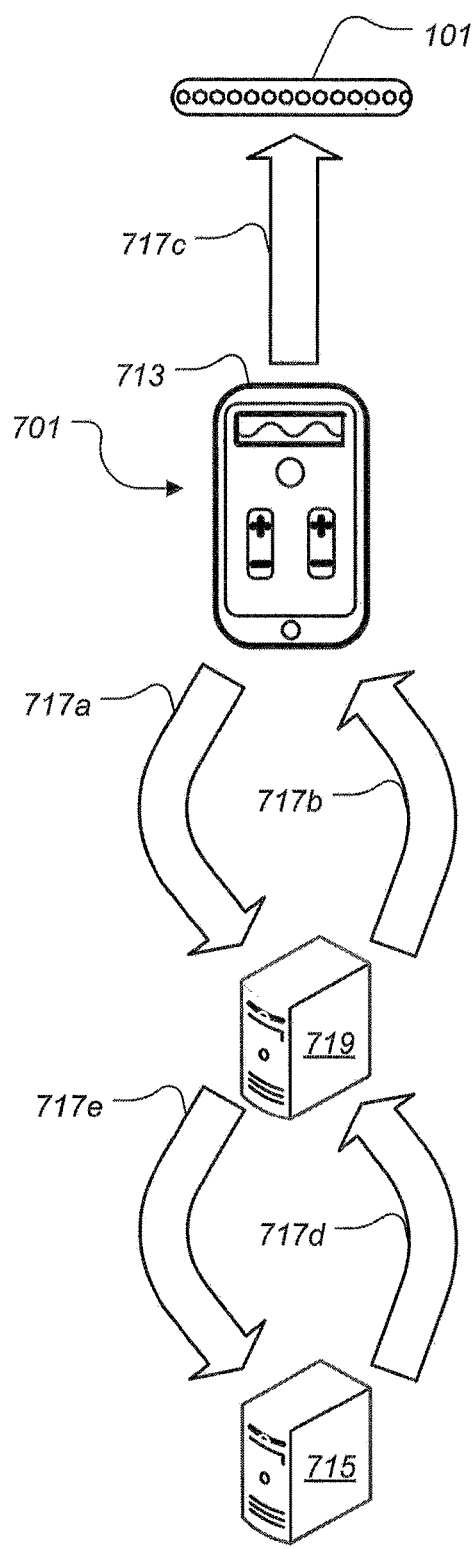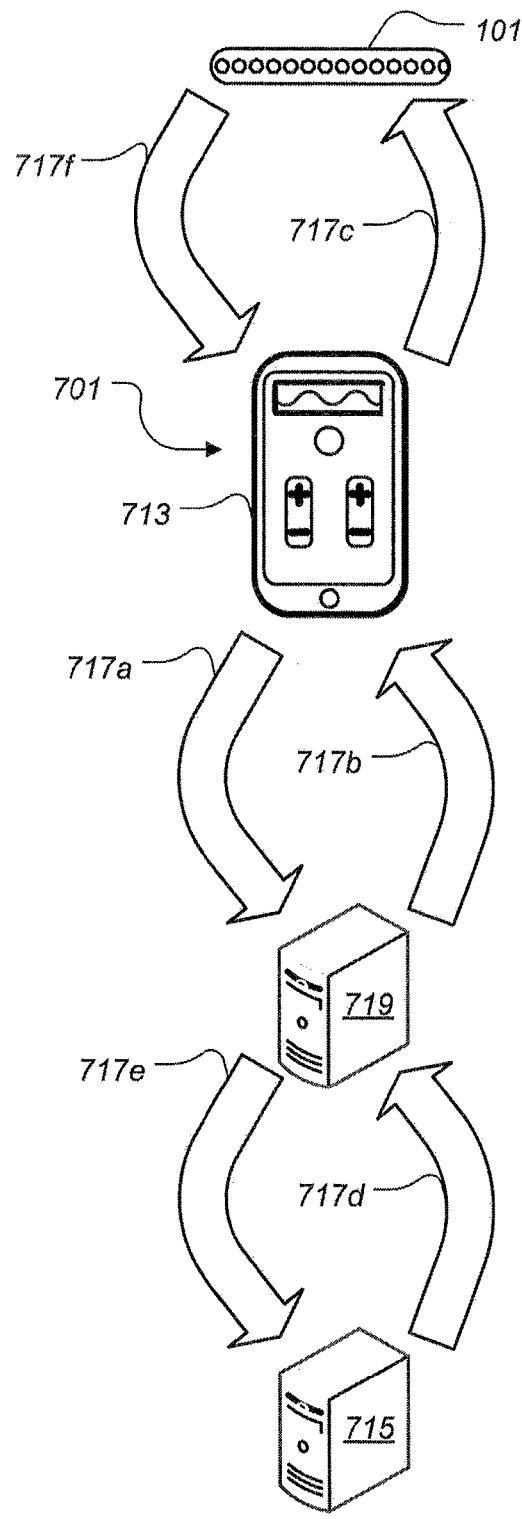
FIG. 7A     FIG. 7B

SYSTEM AND METHOD FOR ALERTING A USER

CROSS REFERENCE TO RELATED APPLICATIONS

This application is a continuation-in-part of U.S. application Ser. No. 14/252,216, filed 14 Apr. 2014, titled "System and Method for Alerting a User," which is a a continuation-in-part of U.S. application Ser. No. 14/153,411, filed 13 Jan. 2014, titled "Alarm Monitoring System," that issued as a patent on 26 Dec. 2017 as U.S. Pat. No. 9,852,656, all of which are hereby incorporated by reference for all purposes as if fully set forth herein.

This application also shares technical disclosure with U.S. application Ser. No. 15/088,696, filed 1 Apr. 2016, titled "System and Method for Alerting a User," that issued on 20 Jun. 2017 as U.S. Pat. No. 9,685,052, which was a continuation-in-part of P.C.T. Application No. PCT/US2015/011080, filed 13 Jan. 2015, titled "System and Method for Alerting a User," and claims the benefit of U.S. Application No. 62/149,923, filed 20 Apr. 2015, titled "System and Method for Alerting a User," all of which are hereby incorporated by reference for all purposes as if fully set forth herein.

BACKGROUND

1. Field of the Invention

The present invention relates in general to the field of devices supporting those with the need to receive customized alerts in a variety of methods from a combination software application in conjunction with smart bulbs, skin and clothing patches, wearables, car systems, airport systems, wireless puck, and/or standalone puck that vibrates and flashes in response to a variety of alerts, such as emergency and non-emergency alerts, from software running on smart phones, computers, and computer tablets.

2. Description of Related Art

There are many designs of systems for alerting users of an event. Typically, a user sets an alarm on their phone or alarm clock and when the time is right, the alarm clock or phone will alert them to the event. Furthermore, users get alerts from text messages, social media notifications, phone calls, voice mails, emails, and emergency alert notifications to notify the user of a multitude of events. However, critical alerts can be inadvertently overlooked. While there are many systems for alerting users well known in the art, considerable room for improvement remains.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 6A is a flowchart of an alternative embodiment of a software application according to the present application;

FIG. 6B is a flowchart of an alternative embodiment of a software application according to the present application;

FIG. 7A is a flowchart of an alternative embodiment of a software application according to the present application;

FIG. 7B is a flowchart of an alternative embodiment of a software application according to the present application;

Figure 1A:
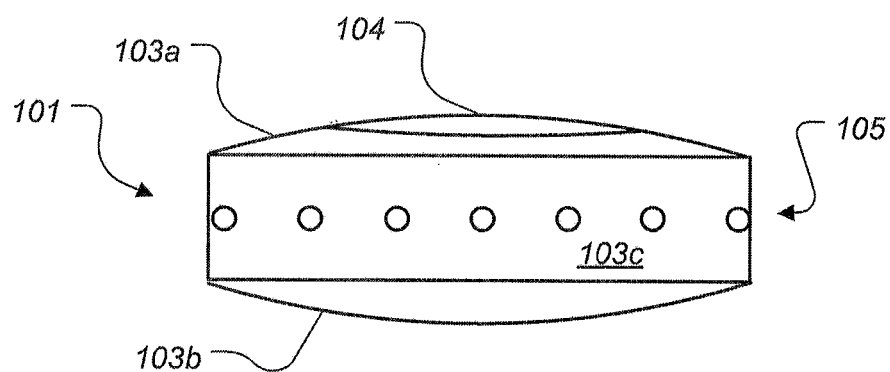
FIG. 1A is a side view of a preferred embodiment of an alerting apparatus according to the present application.

While the assembly of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the apparatus for alarm and alert monitoring are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The vibration strength of typical cell phones is limited and not readily customizable; the sheer number of emails, texts, and phone calls that many cell phone (smart phone) users is large, and important events can end up being ignored because of the high number of events overall. The system comprising an application on a smartdevice in conjunction with a vibrating lighted puck provides the user with a way to selectively receive alerts based on only the most important events as defined by the user and to selectively prioritize those alerts. In addition or in place of the puck the application on a smartdevice drives filtered notifications and alerts to external devices such as an automobile information system, a monitor, a television, a desktop computer, a tabletop display, etc. For example, mass notifications whether opted in or compulsory can be relayed from the sender, such as the government, through the smartdevice and to the puck to notify.

Referring to FIG. 1A in the drawings, a preferred embodiment of an apparatus 101 for alerting a user according to the present application is illustrated. Apparatus 101 or puck 101 is a circular shaped device suitable for being placed preferably adjacent a mattress, under a mattress, or a pillow to alert a user to a specified event. The vibrations produced from puck 101 are suitable for vibrating a bed with enough force to awaken a sleeping adult. While many cellular phones can produce vibrations in response to phone calls and text messages, the vibrations produced by a cell phone are designed to alert an awake user carrying the phone. Vibrations produced by cell phones are not intended for awaking users in the event of an emergency. For example, a pillow reduces the amplitude of vibrations of phone placed underneath them by absorbing the strength of the vibrations of a phone placed underneath it, making the phone ineffective at awakening a sleeping user. Puck 101 is portable and configured to be placed and carried in a pocket, therefore users carrying vibratory pad or puck 101 in their pocket are able to be notified under conditions where their phone would not have sufficient vibratory strength to alert them, such as while working in high-vibration environments (i.e., operating farm machinery or construction equipment), or while wearing loose or bulky clothing which could mask normal vibrations. Furthermore, vibrations from current cell phones do not provide those that are deaf or hard of hearing with the ability to selective limit, or filter, which alerts and phone calls vibrate the phone. Puck 101 provides alerts separate from phones in the forms of internally and externally flashing lights and vibrations both configured to wake users. It should be apparent that other locations, such as a night stand or other location where the puck 101 would be observed and/or felt, are suitable for use. For example a user carrying vibratory pad or puck 101 in their pocket is able to be notified of things that their phone couldn't notify them of, such as an alert from federal agency not sent as a text message. A user in a library places the puck 101 on a desk surface so that they can feel the alerts without disrupting other library visitors. A user in a car is provided with unique vibration to be alerted to specific things without regard to the amount of road noise by placing a puck 101 in a cup holder or in their lap. Puck 101 includes an upper surface 103a and a lower surface 103b. Where the upper surface 103a and the lower surface 103b meet is an outer surface 103c. Upper surface 103a or lower surface 103b includes a lid 104 that allows a user access inside the puck. For example, the user can remove the lid 104 to replace the power source or to change settings by flipping internally located switches, alternatively settings can be programmed remotely. For example, a user can toggle an internal switch to start pairing the puck with the smartdevice or change the color of the lighting elements. While a circular shape has been shown, it should be apparent that other shapes are contemplated by this application, including but limited to a square shape, a rectangular shape, both with and without rounded corners. Alternatively, upper surface 103a and lower surface 103b may be coated, molded, dipped, and/or formed in a friction increasing layer such as rubber. The friction increasing layer reduces the chance the puck is unintentionally moved. The surfaces of puck 101, such as upper surface 103a, may be constructed from various materials, including but not limited to plastic, wood, metal, laminates, or carbon fiber, and may come in different colors, and may include various graphics, images, or patterns that the user can choose from, in order to have a puck that is distinctive in style or that suits a user's decorating preferences.

Puck 101 may include a series of lights 105 located on the outer surface 103c for providing visual alerts to users by flashing lights. In alternative embodiments, the lights 105 are inside the surface 103c and the light is piped to the surface by a translucent substance or diffuser. The lights 105 display various patterns and colors when an alert or alarm is triggered. For instance, red lights may flash in an emergency, but a series of green lights may flash in a pattern when a routine alarm or alert is triggered. The series of lights 105 are typically light emitting diodes (LEDs), however other types of lights are contemplated by this application. The lights 105 also provide configuration information to the user, for example if the puck needs to be recharged, the lights 105 then display a specific color or pattern to indicate to the user that the puck needs to be recharged. Having the ability to uniquely identify alerts associated with emergencies from those alerts associated with non-emergencies increases the response time of users.

Figure 1B:
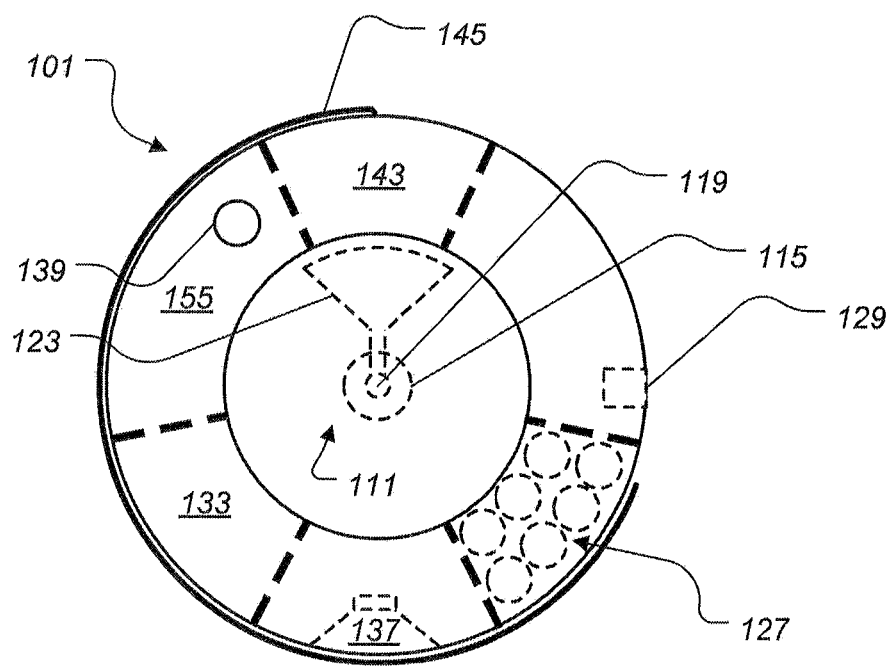
FIG. 1B is a top view of a preferred embodiment of an alerting apparatus according to the present application.

Referring now also to FIG. 1B in the drawings, a preferred embodiment of an apparatus 101 for alerting a user according to the present application is illustrated.

Located inside the puck 101 is a vibration system 111. Vibration system 111 includes an eccentric rotating mass system having a motor 115, a rotatable shaft 119, and a weighed member 123. Shaft 119 is mechanically coupled to the motor 115. Rigidly attached to the shaft 119 is the weighed member 123. When the motor 115 is commanded to spin, the motor causes the shaft 119 to spin. The spinning shaft 119 in turn causes the weighed member 123 to rotate relative to the puck 101 which produces a vibration in the puck 101. The amount of vibration can be adjusted by the speed and acceleration of the motor 115 along with the amount of weight and the offset balance of the weight in the weighed member 123. Other embodiments may comprise arrangements of these connected elements such that the motor, spinning shaft, and eccentric weighted member are oriented in a different direction within the system. Other embodiments of the vibration system 111 include a linear resonant actuator with a weighted member, a piezoelectric crystal, and/or a stepper motor with a weighted member. In those embodiments with a linear resonant actuator the vibration system can provide feedback to the system by measuring the vibrations induced into the linear resonant actuator by the user handling the device, for example the user could stop the alert by shaking the puck 101. Additionally, the vibration system can vary the amount of speed and vibration to create specific patterns of vibration which can be associated with specific alerts and produce patterns of vibrations that meet emergency notification requirements as specified by governing bodies, such as those specified in UL 1971.

In the preferred embodiment, the puck includes a rechargeable battery pack 127. Alternative embodiments of the puck allow for the battery pack to be easily replaceable, such as a 9-volt battery. The pack 127 provides the puck with power and is electrically coupled to the various electrical subsystems of the puck 101. In an alternative embodiment the weight in the weighed member 123 could be partially or completely comprised of a battery pack. This allows the puck to be smaller and weigh less because the weight of the required power storage unit can serve as the required weight for the weighed member 123. The vibration system would then need a slip ring (not shown) to electrically couple the rotatable battery to the electrical system. In the embodiment including a linear resonant actuator the weighted member battery would use a slackened wiring harness to electrically couple the battery to the rest of the system. Typically puck 101 includes a charging port 129 for electrically coupling an external charging device to the puck 101 for charging of battery pack 127 or powering the puck itself in addition to or in place of the battery pack 127. Charging port 129 is preferably a female micro universal serial bus type port or a barrel plug type port, however other charging port configurations are contemplated by this application such as wireless charging. Puck 101 includes a battery monitoring system configured for monitoring the rechargeable replaceable battery pack 127. The battery monitoring system provides visual and vibratory feedback to the user regarding the conditions of the rechargeable replaceable battery pack 127. The conditions of the rechargeable replaceable battery pack 127 include: the amount of stored energy in the rechargeable replaceable battery pack 127; the health of the battery cells in the rechargeable replaceable battery pack 127; and/or the need for replacement of the rechargeable replaceable battery pack 127. Visual feedback from the battery monitoring system includes flashing either a specific light, such as a red LED, blue LED, and or green LED, or a pattern of flashing lights, such as a slow decrease in intensity. Vibratory feedback includes having the vibration system 111 produce a specific pattern of vibrations to alert the user to the conditions of the rechargeable replaceable battery pack 127.

Puck 101 may include a plurality of sensors 133, located both interior and exterior to the puck, enabling the puck 101 to measure the environment located near the puck and conditions a distance away from the puck. The plurality of sensors 133 includes motion sensors, buttons, accelerometers, proximity sensors, strain gauges, touch sensors, pressure sensors, temperature sensors, moisture sensors, microphones, and other sensors such as those sensors that are a part of IOT devices that transmit data via text, API or cloud based interfaces. The sensor or sensors that measure sound, such as the microphones, are uniquely configured to detect the characteristic sounds of things that a user would want to be alerted of in the event they were unable to hear them normally (i.e., the user is deaf, hard of hearing, at a distance from the sound, or asleep)—sounds such as crying, knocking, yelling, glass breaking, and shouting. For example a sensor specifically, with a filter, for listening for only a tea kettle whistle. The sound sensors and software located inside and outside the puck are configured to analyze the incoming sound and interpret the sound against proprietary data on sound profiles of these specific sounds, including compensation for how the specific sensor's type and location affects the nature of the sound being observed (such as a puck that is placed under a pillow). The motion sensor and proximity sensors included allow the puck 101 to register that the user is moving in close proximity to the puck, so that, for instance, a puck placed next to a sleeping child can alert the mother, by alerting the smart device, if the child moves around. This also allows a user to interact with the puck 101 without actually having to touch the puck 101. For example, also, a user can place an external motion sensor near a door and be alerted by the puck when someone enters the room. The accelerometer allows the puck to measure the amount of movement of the puck relative to a prior location. For example, the puck 101 placed under a pillow, can detect movement by a user that is awakening from sleep. This provides the puck 101 with dynamic feedback information that can be used to adjust the vibration output of the puck as the user either wakes up or falls back asleep. The strain gauges, touch sensors, and pressure sensors are used by the puck 101 to measure the force applied to the puck in a given situation. Similar to the accelerometer scenario above, the strain, touch, and pressure sensor(s) can, for example, when placed under a pillow at night, measure the pressure of a user's head on the pillow, and as the user awakens from sleep and raises their head off the pillow, adjust the amount of vibration in the puck 101 accordingly. An alternative embodiment of puck 101 includes a global positioning system for positional data. This reduces the likelihood of the puck being lost, and also it provides the software application with information regarding the puck's location relative to other sensors and relative to the mobile device to which it is connected wirelessly. Puck 101 is able to communicate directly with external sensors using dual band, redundant communication, wired or wireless, as well as through communications relayed though the associated smart device. For example, the user could have a first sensor mounted to their door to detect knocking, and that sensor causes the puck 101 to vibrate to a specific pattern and/or flash a pattern of lights; however, if the first sensor is outside direct communications with puck 101 or the associated smart device, the first sensor can relay data to a second sensor which may be in communication with the puck 101 or associated smart device.

Puck 101 may include a speaker 137 to allow the puck 101 to generate audible alerts. Puck 101 includes a switch 139 that allows a user to acknowledge an alert or activate a snooze from the puck 101 by moving the switch 139. While the switch has been indicated on the top of the puck, it should be apparent that the switch could be located on other surfaces of the puck 101 or recessed into a surface to prevent accidental activation of the switch. Furthermore, it should be apparent that multiple switches could be used, for example the outer surface 103c or other surfaces could be a pressure sensitive switch enabling the user to merely touch the puck 101 to acknowledge the alert. Alternatively, a strain gauge or pressure sensor is used in addition to or in place of switch 139, measuring the forces on the puck 101, and allowing the user to twist or torque the puck 101 slightly to acknowledge the alert. Alternatively a proximity sensor and/or motion sensors can be used in addition to or in place of switch 139, detecting specific motions near the puck, such as waving of the user's hand over the puck in a certain way, in order to acknowledge the alert. Preferably switch 139 only functions after the puck has vibrated for a set period of time to reduce unintended acknowledgement of the alerts. Puck 101 can utilize an accelerometer or gravity switch to determine when the puck has been flipped over once or twice in a short amount of time, for example 5 seconds, and activate a snooze feature, or turn off the alert or alarm, based on flipping the puck once or twice, dependent upon how the puck is configured by the user.

Puck 101 includes a communication system 143. In the preferred embodiment the communication system includes a wireless signal transmitter and receiver, preferably located on a microchip on the puck 101's circuit board, and antennas, such as antenna 145, coupled to them in order for the puck 101 to send and receive wireless information. The preferred wireless configuration provides the puck 101 with the ability to communicate via a Bluetooth adapter to the smartdevice and to other Bluetooth enabled devices via the Bluetooth, however other wireless configurations are contemplated by this application. For example, the puck, in other embodiments with other wireless protocols such as Zig Bee and Z-Wave, includes a cell phone receiver and transmitter with a SIM card and/or a WIFI interface so that the puck 101 can connect to the global internet. The communication system 143 allows the puck 101 to be in communications, both wired and wirelessly, with external devices such as smart phones, computers, controllers, and external sensors. Communication system 143 provides the puck 101 with a handshaking system to the smart device. The handshaking or pairing of both single pucks and multiple pucks to a single smart device prevents unauthorized users access to the puck 101 and allows the smart device to control several pucks concurrently.

Controller 155, typically located on a circuit or PC board, is electrically coupled to the various subsystems of the puck 101 including the communication system 143, the speaker 137, switch 139, and the plurality of sensors 133, rechargeable and/or replaceable battery pack 127, the charging port 129, the lights 105, and the vibration system 111. Controller 155 takes commands from the software in conjunction with the smart device via the communication system 143 to activate the vibration system 111, the lights 105, and the speaker 137. Controller activates the lights 105 to indicate the rechargeable and/or replaceable battery pack 127 needs to be recharged or replaced. Lights 105 in an alternative embodiment include a red light as a low battery indicator and a blue light for indication of a wireless link between the puck 101 and the smart phone or smart device. A smart phone or smart device includes a screen for displaying information to a user, a processor, local data storage on the smart phone, a wireless interface for connecting the smart phone with other devices on a network, and a wireless interface for connecting the smart phone to the puck 101, and an alerting system for receiving notifications from the smart phone and others across the network. The notifications or alerts could be in the form of text messages, timers, alarms, pushed events, calendars updates, emails, social media notifications such as Facebook and Twitter updates, phone calls, video chats, emergency alerts, and weather alerts. The system relays all types of emergency alerts including direct ones from the carriers, ones sent via IPAWs, text based ones from private entities, and state and local governments whether the alert goes through a carrier or text based or other alternatives. An alternative embodiment includes non-volatile memory for storage of events, alerts, timers, vibration patterns so that the puck 101 can independently alert a user in the case the smart device is turned off or the wireless communication system is not functional. It should be apparent that the internal elements of the puck can be rearranged to increase the functionality of the puck, for example to increase the wireless conductivity and or reduce the power consumption of the device. Furthermore, the system can utilize redundant multiple channels of alerts such as text messages and social media posts about the same emergency to insure the user is notified in case cellular towers are down. Additionally, the system comprised of the application and the alerting device, such as the puck, is able to receive secured communications thereby reducing the likelihood the system can be hacked. Secured communications can be verified by comparing notifications from a plurality of sources to increase the likelihood a notification is authentic.

Figure 2A:
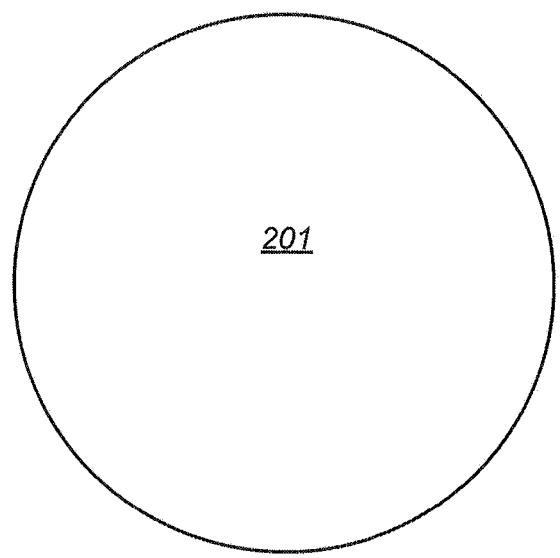
FIG. 2A is a side view of an alternative embodiment of an alerting apparatus according to the present application.
Figure 2B:
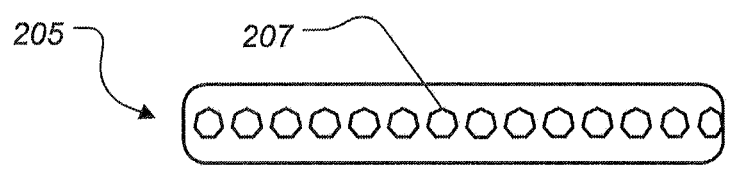
FIG. 2B is a top view of an alternative embodiment of an alerting apparatus according to the present application.

Referring now also to FIGS. 2A and 2B in the drawings, alternative embodiment of an apparatus 201 for alerting a user according to the present application are illustrated. Puck 201 is similar to puck 101 with the similar battery, similar sensors, similar communication system, and similar controller with memory. Puck 201 in contrast to the puck 101 is designed to be a smaller unit with less maintainability than puck 101. The battery of puck 201 is not readily replaceable by the user. Furthermore, the battery of puck 201 is charged by wireless induction of power without use of a plug located on the puck 201. Without having a charging port on the puck 201, the likelihood of moisture invasion of the puck is greatly diminished.

Puck 201 includes a plurality of light emitting diodes (LED) 205 arranged around the outside edge of the puck. Typically, each LED 207 is comprised of three individual LED each with their own color. Typically, there is a red, green, and blue LED closely packed into a single LED 207. Having the ability for the puck 201 to individually control each color of each LED 207 allows the puck to produce a variety of optical patterns of various colors in response to various events. For example, the more important the event, the brighter the intensity of the LED's 205. Additionally, the pattern of lights can be made to match the pattern of vibrations from the puck 201. The pattern of vibrations reflected in the matching pattern of lights will allow the user to recognize, both visually and physically, the source of the noise whether it is a rapid knocking on the door, the repeated pattern of a siren etc.

While single pucks have been illustrated, it should be apparent that multiple pucks can be combined into a single system. This allows a single smart device to set alerts for multiple pucks. For example, a mother could set alerts from her smart phone, her computer, or a cloud based application on a server, for herself and her three children, each having their own pucks. Since each would get a different alert they would not have to be woken up at the same time as would be the likely result of a single alarm clock for three children. A combined base would allow a user to charge multiple pucks concurrently. In addition to the multiple pucks, the smart device can be programmed to activate alarms on Bluetooth or Wi-Fi enabled clocks with speakers, lights, and/or displays for messages. This feature provides the user with the ability to coordinate a group of alarms and devices. For example, a mother could set alerts from her smart phone for herself and her three children, each having their own pucks and an alert for her husband's Bluetooth clock to sound at 3:00 pm to start dinner. Additionally, the system can vibrate the mom's puck along with the children's puck in response to an IoT device, such as a Wifi doorbell, while not vibrating the husband's puck in response to the doorbell. This feature prevents the user from having to go to several devices separately and set several alarms. Furthermore, each puck can relay information to another puck thereby forming a mesh network amongst the pucks. For example, first puck is in communication with smart device and second puck. However, second puck is out of range of direct communication with smart device, first puck can relay data between second puck and smart device so long as first puck and second puck are in communications with each other.

Figure 3:
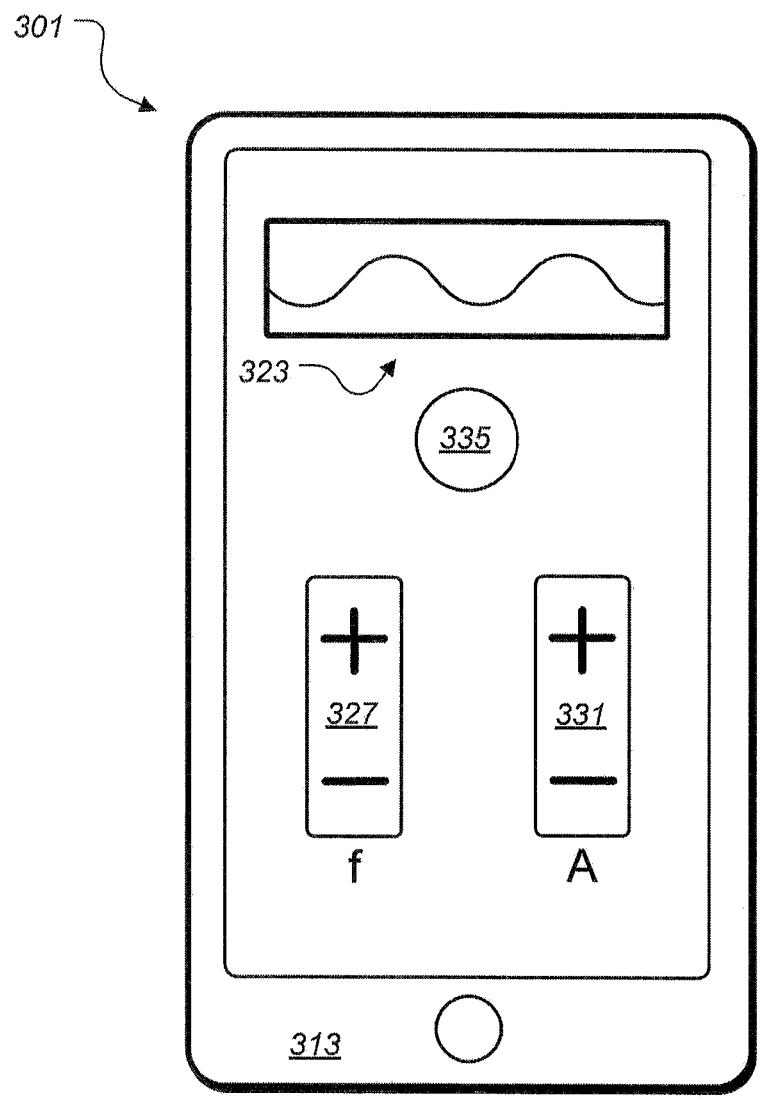
FIG. 3 is a perspective view of a preferred embodiment of a software application according to the present application.

Referring now also to FIG. 3 in the drawings, a preferred embodiment of a software application 301 on smart device 313 according to the present application is illustrated. To interface with the puck 101, software application 301 allows a user to select events, times, alarms, alerts, triggers, and such, so that the puck alerts the user to the various events as programmed by the user. Furthermore, the system allows users to filter notifications to selectively activate the puck. As shown, the software application 301 is programmed to be executed on a smartphone 313, however it should be apparent that other devices such as tablets, computers, smart televisions, smart watches, and other smart devices like wi-fi/Bluetooth enabled clock and other notifications systems, visual notification systems, and such that are able to be paired with the puck 101 and be interfaced with it. The software application 301 has various ways of alerting the user—including overlaying on the home screen of the smart device, vibrating the puck, flashing lighting elements on the puck, flashing a display on a paired vehicle.

Software application 301 includes the ability for the user to control which event triggers the alert and to specify the type of alert that is produced by the puck. Possible events for triggering alerts include time-based events, signals from remote sensors like door knock sensors, microphones, smoke alarms, and more, plus notifications from a wide range of communication channels such as emails, text messages, social media updates, instant messages, inbound phone calls, and more. Remote sensors can be connected to the system across the Internet of Things. For example, smoke detectors having wireless system integral to the smoke detector can notify the smart device across a network connection of a fire. Additionally, toasters having wireless system integral to tile toaster can notify the smart device across a network connection when the toast in the toaster is toasted. A vehicle left unattended in a garage can notify the user.

In conjunction with a listening or noise sensing device, the software application 301 can trigger an alert based upon audible inputs, such as a ringing phone, a fire alarm sounding, a smoke alarm sounding, a carbon monoxide alarm sounding, a radon gas alarm sounding, shouting by a person, snoring, knocking, screaming, crying, etc. Software application 301 allows a user to set a plurality of alerts or events related to the various alerts and then configure which methods of alerting are appropriate for each event.

Software application 301 includes the ability of the user to import contacts and calendars, choose from contacts and calendar events stored on the smart device, or input contact characteristics (name, phone number, email address) for the purpose of limiting alerts to occur only when, for example, a text message or other communication arrives from a specific person that is in the contact list, and to specify what type of alert (vibration pattern, flashing light pattern) is generated in that instance. For example, the user sets a single 3 second light vibration for each time the software application 301 registers a text message from a specific person or persons.

The user can also define specific time periods in which alerts triggered by incoming messages, texts, calls, and other sources are allowed to vibrate the puck. Software application 301 allows the user to designate any alert as an "emergency" alert which automatically triggers the strongest vibration and the most noticeable LED patterns. Furthermore, the software application 301 allows the user to control the signaling hardware such as the lighting elements. The user can select lighting patterns, lighting intensity, lighting color, which specific lighting elements are activated dependent upon the type and quantity of alerts and notifications. The user can customize the vibration pattern in response to the emergency notification by adjusting: the duration of the vibration output of the puck, including the start time, stop time, intensity, and duration of the vibration. Furthermore, the user can make the pattern repeat, ramp up, ramp down, a square pattern, a sinusoidal pattern, a saw pattern, intermittent, or combination of any of these types. The user can select vibration, lighting and or a combination of both as desired.

Software application 301 also connects puck 101 to an Internet-based service consisting of additional software (a server), capable of receiving mass notifications from local, state, and federal governments. For example, FEMA sends a message warning of a hurricane to residents of a certain area, and the puck 101 in conjunction with software application 301 vibrates and alerts the user. The aforementioned message from FEMA in some embodiments is in the form of a widespread SMS/Text message directed to a list of users that provided their contact information to FEMA or alternatively in a form such as a notice where FEMA doesn't have a contact number or an email address of the user, like a bulletin. The aforementioned service would be hosted externally and would act as a clearing house or directory of emergency alert services. It would provide the ability for the user to more easily identify, select, and enroll in alerts from one or more emergency management agencies (e.g. FEMA) or any other publishers of emergency information. The aforementioned service would also allow a user such as a hospital administrator to create a group notification list whereby specific alerts could be forwarded simultaneously to all participating doctors on staff via their respective smart devices and pucks. The aforementioned Internet-based service would also enable the user to easily and automatically configure their web-enabled smart device to produce specific alerts in response to various events. An example of this capability is anticipated in Israel, where users of the puck can rely on the puck's strong vibrations in response to air raid alerts, both in audible form from an external sensor and in from an inbound electronic message such as a text or email, from the government.

Software application 301 includes a visual representation 323 of vibration output of the puck 101. Visual representation 323, can also be reproduced through light emitted from the LED's or wirelessly connected smart light-bulb. The visual representation provides a user with the ability to visually see the vibration pattern or the expected vibration output over a time period. Alternatively the user can select no pattern and just a lighting color and intensity. The user can customize the vibration pattern by adjusting: the duration of the vibration output of the puck, including the start time, stop time, intensity, and duration of the vibration. Furthermore, the user can make the pattern repeat, ramp up, ramp down, a square pattern, a sinusoidal pattern, a saw pattern, intermittent, or combination of any of these types. The patterns can also be made to represent real world vibrations or sounds, such as trains passing, sirens, ocean waves crashing, door knocking, etc. For example, the user can set the puck 101 to produce minimal vibrations at the start of the alert but as time passes the intensity of the vibration is increased in response to the passing of time. Software application 301 allows a user to manually adjust the frequency 327 and the amplitude 331. Icon 335 is a representation of the puck 101 on the display of the smart device 313. As the user adjusts the vibratory output of the puck, the smart device 313 can activate the vibration feature of the smart device 313 to give the users a physical representation of the expected output of the puck 101. Furthermore, the icon 335 displays the quality of the wireless connection between the smart device 313 and the puck 101. User is able to select the icon 335, thereby producing a vibration from the puck 101, therefor testing the system. This feature allows the user and the system to realize the puck is not in communication with the smart device 313. This prevents a user from missing an alert because the puck is out of range or out of charge. The smart device can be configured to prevent an alert from being set if no puck 101 is connected or if no alert can stored in the memory of the puck itself. Additionally, if the connection with the puck 101 is corrupted or lost, the smart device will alert the user of the lost connection. The nature of the alert will appear on a home screen on the smart device 313, notifying the user of the act nature of the alert, e.g. emergency vs. a personal alert/alarm.

Preferably the software application 301 sets the configuration for puck 101 and doesn't need to remain in communications with the puck for certain events. Therefore, if the smart device is unavailable the puck would still alert the user to the specified event. The configuration information sent to the puck 101 includes at least: when to alert, the type of alert; and the duration of alert. Alternatively, the puck 101 only vibrates in direct response to commands from the software application 301 running on the smart device 313.

Figure 4:
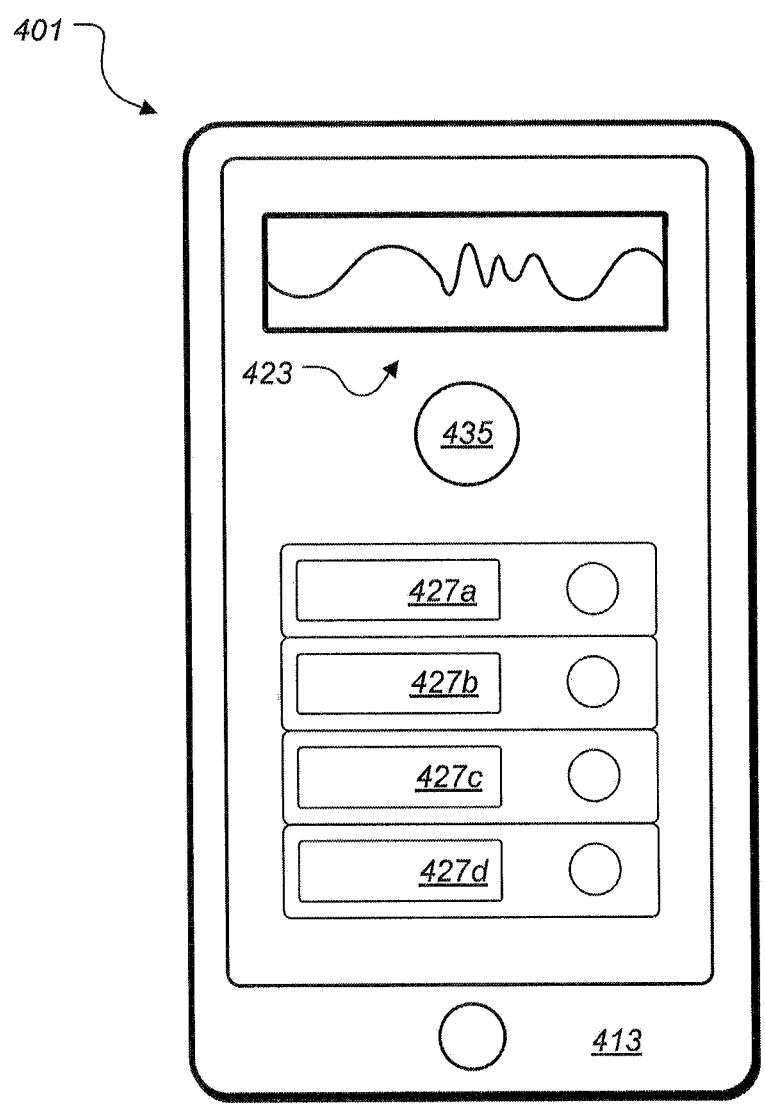
FIG. 4 is a perspective view of an alternative embodiment of a software application according to the present application.

Referring now also to FIG. 4 in the drawings, an alternative embodiment of a software application 401 on smart device 413 according to the present application is illustrated. Software application 401 includes a visual representation 423 of vibration output of the puck 101. If the user has music stored on the smart device 413, the software application 401 gives the user the ability to select tracks of music from the stored music on the smart device 413, such as track A 427a, track B 427b, track C 427c, or track D track 427d. The user can scroll through a listing of their music and select the track to replicate in a vibration pattern that is compatible with the vibration system of puck 101. While music inherently is vibratory, if a song has a pattern at a high frequency such as 3,500 Hz a user typically cannot feel the pattern from vibrations without high amplitude. The system can then apply the musical waveform to the vibratory waveform such that output of the vibration system of the puck 101 is similar in beat to that of the selected music track. Additionally, the system is able to pattern vibratory patterns based upon musical notes or other patterns. For example, the system can convert a digital music file from an audible form into a sensory form. This process converts the frequencies of the audible file from their high frequencies, such as 500 Hz-20, 000, into low frequencies, such as 1-500 Hz through frequency shifting. Therefore, the user can feel the pattern of the song as opposed to hear it. Shifting and scaling the music to provide musically inspired vibratory wake up patterns increases the quality of life for those that are deaf and hard-of-hearing as they cannot use a standard alarm radio to be awoken by their favorite music because they cannot hear the music over the speaker. Icon 435 is a representation of the puck 101 on the display of the smart device 413.

An alternative embodiment of puck 101 includes the ability of the user to adjust the duration, intensity, and the pattern of the vibration. Furthermore, the user is able to program the puck 101 via the smart device 413 with a specific pattern, for vibrations or lights, in response to a specific alert, and designate between emergency and non-emergency notifications. For example, the user would typically set the vibration to max intensity, duration, and an abrupt on-off pattern repeating indefinitely for an emergency-type alert, such as a tornado warning text. The user would then reduce the intensity and duration and make the pattern less abrupt for alerting them that a visitor was at a door knocking. Alternatively, the pattern of the lights or vibrations can mimic the pattern of the source. For example, the pattern of vibration emitted by the puck 101 matches the vibrations of footsteps sensed or the light pattern of the LED's matches the cadence of a phone ringing thereby helping someone both hearing and visually impaired.

Additionally, the system is able to utilize a feedback loop to determine how best to wake a user based on their sleep cycle. The system utilizes the variety of sensors to measure the sleep pattern of the user. Typically, the system measures the user's restlessness with motion sensors, accelerometers, and strain gages, as well as the temperature of the user with thermocouples. This also provides the system with the ability to check if the user is awakening in response to the vibrations. The system can modify the vibration intensity to awaken the user if a lower setting doesn't appear to be working after a period of time. Inputs from the various sensors are cross-referenced with a database of information that allows the system to interpret the sensor information based on the location of the puck (i.e., under a pillow, below a mattress, on a table, in a coat pocket). Since movement, sound, pressure, etc will all be received differently by the sensors, based on the location of the puck itself, a proprietary database of information is critical to interpreting a signal from one of the onboard sensors. For instance, a noise heard from under the pillow will be different than one heard from on top of a table. Similarly, movement from someone waking up will need to be interpreted differently based on whether the puck is located below the person's head under the pillow, or under the mattress itself. The proprietary database will be cross-referenced and the appropriate analysis will then be possible. Typically, the system is programmed via a smartphone, computer, or tablet by way of a computer based software application. Additionally, the system can share data with enuresis or sleep apnea equipment to provide conditional information to the sleep apnea machine, as well as, receive a signal from the sleep apnea machine to alert the user with a specific vibration.

Figure 5:
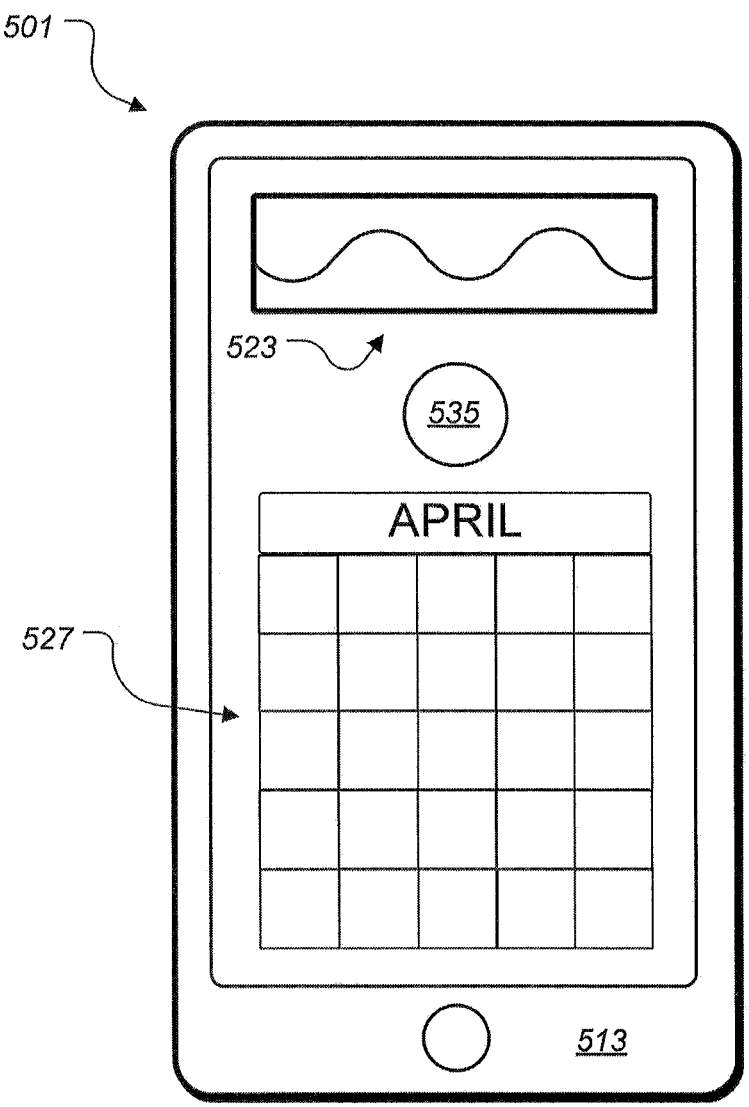
FIG. 5 is a perspective view of an alternative embodiment of a software application according to the present application.
Figure 8:
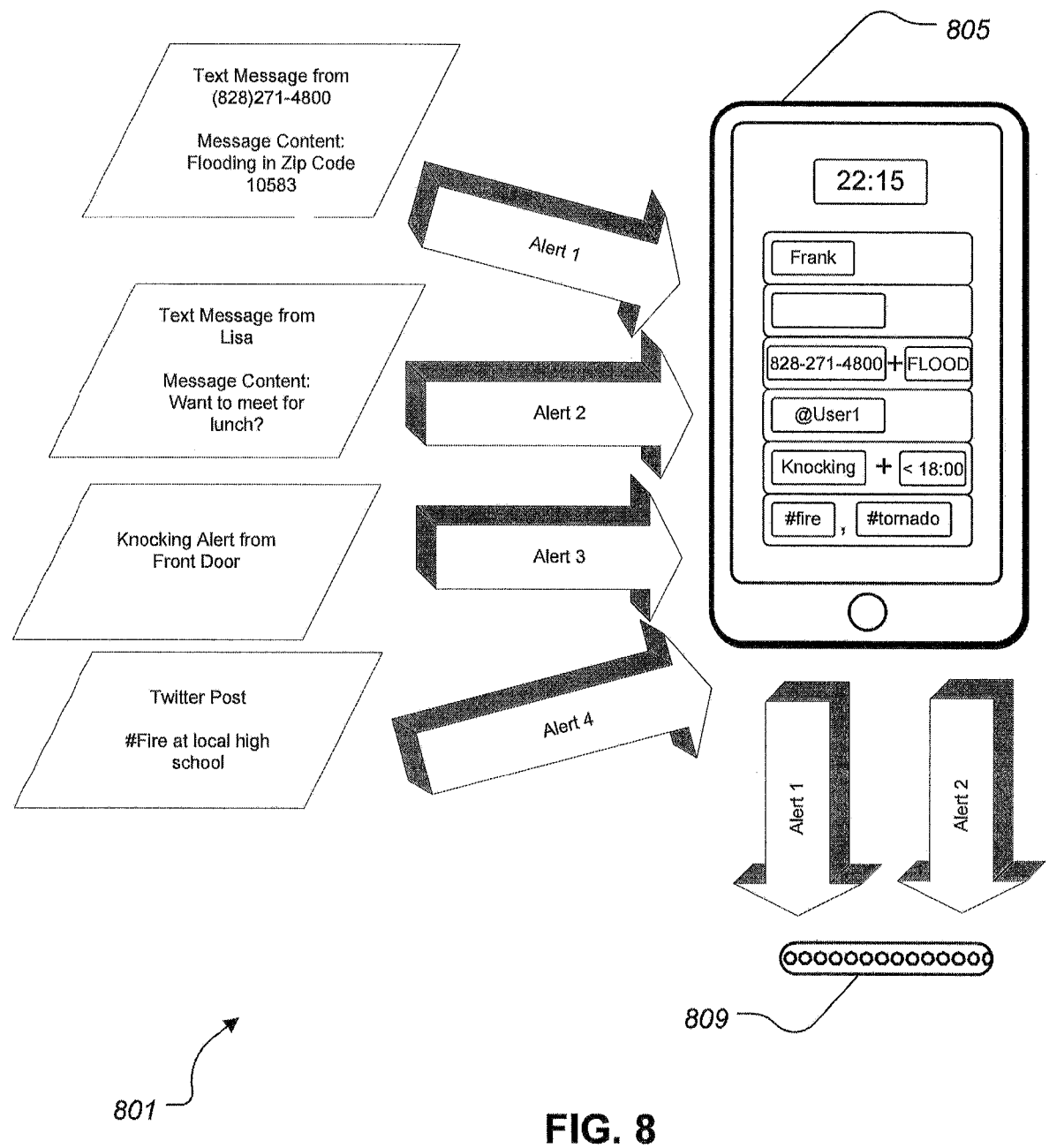
FIG. 8 is a flow chart of an alternative embodiment of an alerting system according to the present application.

Referring now also to FIG. 5 in the drawings, an alternative embodiment of a software application 501 on smart device 513 according to the present application is illustrated. Software application 501 includes a visual representation 523 of vibration output of the puck 101. The user of software application 501 can set an alert based on their calendar 527. Preferably calendar 527 is imported from their cloud based calendar and allows the user to remotely set the software application 501 to vibrate from an appointment set remotely to the smart device 513. The user is able to set different patterns for the different types of alerts. For example a text message alert might be shorter with less intensity and an alarm might be longer duration with maximum intensity. Software application 501 includes an icon 535 that is virtual representation of the puck 101 and vibrates as the puck 101 vibrates. Software application 501 is configured to allow a user to adjust the snooze settings, repeat alerts and alarms, the type of waking, the duration, the gradients or vibration patterns, emergency alert responses, and default settings for both the vibrations as well as the LED lights. The software application 501 is integrated with other software on the smart device 513. When the smart device receives a phone call the software application 501 sends a predetermined vibration and/or LED pattern to the puck 101. Specific contacts from the smart device 513 can be assigned specific vibration and LED patterns from the software application 501. The software application 501 could be of several different versions, such as a free version and a paid version, with various levels of features enabling the manufacturer or publisher the ability to customize the software to the type of customer.

The software application 501 provides the user the ability to select exactly how the puck 101 will react to the alarms or alerts (hereinafter described as simply "alerts"). The user can select whether the puck 101 will vibrate, flash, and sound an audible alarm, both in conjunction with and without other peripherals, based at least on the type of alert, the urgency of the alert, the time of the alert, what to do if the alert is not acknowledged in a certain period of time and/or the source of the alert. Furthermore, the user can customize the vibrations, the flashing, and the sounds based at least on the type of alert, the urgency of the alert, the time of the alert, what to do if the alert is not acknowledged in a certain period of time, and/or the source of the alert. User is able to set a timer with a period of time and at the end of the time the puck 101 will vibrate to alert the user. For example, the user wishes to take an hour nap, they would set an hour timer and then be awoken by the vibrations and lights from the puck 101 in an hour.

Referring now also to FIG. 6A in the drawings, an alternative embodiment of a software application 601 on smart device 613 according to the present application is illustrated. First server 615 is a computer based system having a microprocessor in conjunction with local memory connected to a data network. First server 615 typically is maintained by a federal agency, such as FEMA, and utilized as a source for the public for emergency alerts. The emergency alerts can be in the form of a text message, a phone call, a video message, a webpage, a SMS message, an email, or a document. While only one server is shown, it should be apparent that multiple servers can be in communication with software application 601. It is expected that each federal and state agency would maintain control of their own servers such as first server 615. Software application 601 transmits user data 617a to the first server 615, such as a zip code or GPS coordinates, and first server 615 transmits location specific alerts 617b to the software application 601. Software application 601, based upon user's inputs, selectively determines which alerts from the first server 615 are then relayed 617c to the puck 101 for alerting the user. Additionally, alternative embodiments of puck 101 can receive alerts 617d directly from the first server 615 and bypass smart device 613 if for example the battery on the smart device is drained.

Referring now also to FIG. 6B in the drawings, an alternative embodiment of a software application 601 on smart device 613 according to the present application is illustrated. In this alternative embodiment the puck 101 transmits data 617e back to the smart device 613 and the software application 601. The transmitted data 617e from the puck 101 includes: acknowledgement that the alert was received; conditional information such as temperature, orientation, accelerations, and strains; positional information such as latitudes and longitudes of the puck; and snooze signals. Furthermore, it should be apparent that transmitted data 617e can be further relayed back to first server 615 for data collection.

Referring now also to FIG. 7A in the drawings, an alternative embodiment of a software application 701 on smart device 713 according to the present application is illustrated. First server 715 is a computer based system having a microprocessor in conjunction with local memory connected to a data network. First server 715 typically is maintained by a federal agency, such as FEMA or NOAA, and utilized as a source for the public for emergency alerts. While only one server is shown, it should be apparent that multiple servers can be in communication with software application 701. It is expected that each federal and state agency would maintain control of their own servers such as first server 715. Second server 719 is a computer based system having a microprocessor in conjunction with local memory connected to a data network. First server 719 typically is maintained as a clearinghouse specifically for alerting puck users. Software application 701 transmits user data 717a to the second server 719, such as a zip code or GPS coordinates, and second server 719 transmits location specific alerts 717b to the software application 701. Software application 701 in conjunction with, second server 719 selectively determines which alerts from the first server 715 are then relayed 717c to the puck 101 for alerting the user. Each puck 101 includes a unique identifier, such as an Internet protocol number, so the system can identify each puck uniquely. Second server 719 receives alerts 717d from first server 715. Second server 719 transmits data, such as location information, 717e to first server 715.

Software application 701 in conjunction with second server 719 and first server 715 aggregates the alerts by creating a listing of possible alerts the puck user can sign up for based upon the location of the user. Since the user is connected to the cloud, a user of the puck though the software application 701 selects which alerts to subscribe to through the smart device 713. Use of second server 719 by a user of the puck 101 is through a subscription model where the user pays a fee on an interval for the server to monitor and relay alerts from the first server 715 to the smart device 713. Furthermore, second server 719 stores enterprise wide alerts to send alerts to multiple pucks around the world concurrently. For example a hospital could notify all employees of an emergency call up by providing pucks connected to the second server 719. The hospital is able select a group of employees at a certain facility to all receive the same alert to report to work. Another example includes a news corporation providing alerts to users based upon news alerts or social media outlets. Another example includes a government providing alerts to citizens based upon conditional information.

Referring now also to FIG. 7B in the drawings, an alternative embodiment of a software application 701 on smart device 713 according to the present application is illustrated. In this alternative embodiment the puck 101 transmits data 717f back to the smart device 713 and the software application 701. The transmitted data 717f from the puck 101 includes: acknowledgement that the alert was received; conditional information such as temperature, orientation, accelerations, and strains; positional information such as latitudes and longitudes of the puck; and snooze signals. Furthermore, it should be apparent that transmitted data 717f can be further relayed back to both first server 715 and second server 719 for data collection.

Smart device 713 in conjunction with software application 701 is able to provide the user the ability to define how various alerts are indicated or announced to the user a distance away from the puck 101. In addition to controlling the LED's which are present in the puck 101, software application 701 allows users to broadly control radio controlled lightbulbs, such as the Hue system, to indicate alerts to users. The color, the intensity, and the pattern of the lights can be coordinated by the user through the software application 701 to provide flexibility to the user's notification of alerts. For example, when software application senses a fire, via connected sensors, the software application 701 changes the lighting of all the rooms to a red color to alert the user of a fire. Furthermore, software application 701 when connected to a water detection sensor can change the lighting from white lighting to blue lighting in response to a water leak. A door knock sensor, connected to the smart device, allows a user to sense a door knock as the lights in a room flash in response to a knock at a door. Colors and patterns can be assigned to various types of alerts such that a particular number of a phone call or text message generates a particular color as assigned by the user in the software application 701. For example, a user selects an orange light alert when their father messages them, as the father's college color is orange. The ability to visual see the alerts through the Bluetooth and wifi connected lightbulbs is in conjunction with vibrating the puck 101. Preferably the alert will make it to the user device such as puck and other devices such as skin and clothing patches, smart bulbs, other IOT devices no matter the path to the device.

Users with visual impairment need audible confirmation of the system's configuration; therefore software application 701 is able to recognize human speech as an input to the smart device 713. For example, a user can speak to software application 701 and command it to vibrate the puck 101 and flash the lights nearest the bed in response to a particular number. This provides the user an easy way to set reminders and configure how the system will respond to predetermined alerts. Furthermore, the software application is able to provide feedback to the user in an audible form so that the user can hear the conditions of the software application 701. Deaf & blind individuals need haptics. For example, the user can speak to the software application 701 asking what the response will be from an emergency alert from the government and the software application 701 will generate a spoken response understandable to the user telling the user that the puck 101 will vibrate until acknowledged and all lights connected to the software application 701 will flash until acknowledged by the user.

System 801 is comprised of a smartdevice 805 and a puck 809. As the smartdevice is signaled with text messages, phone calls, emails, social media posts, and other notifications, users need a system and method to reduce the amount of notifications to the puck. The system monitors all notifications from the smartdevice, computer, tablet, or web based application. Once a notification is detected, the filters and the conditions of the filters, as set by the user to generate an alert, help the system to determine if the puck should vibrated in response to the notification based upon the filter characteristics of the user defined alert. A user is able to configure the smartdevice 805 with a "What you see is what you get" WYSIWYG interface to watch for only specific notifications that meet specific conditions and characteristics from the variety of various sources. The user can select contacts, words, senders, recipients, sources, types, numerical conditions, and times as filters and combine them together to make more selective filters. Logical statements, such as AND +, OR, NOT −, ELSE, GREATER THAN >, LESS THAN <, EQUALS=, are provided to the user to allow them to arrange and combine filters as needed to create more complex conditional filters. As shown the user created a filter for certain notifications to trigger an alert. Some notifications are scanned for additional filter elements such as specific word, phrases, or numbers in the content of a text message, email message, or other notification. For example, in alert one, a text message from phone number (828)271-4800 will vibrate the puck because the text message also contains the desired term "FLOOD". Alert two, a text message from Lisa, will not be transmitted to the puck because the sender Lisa is not on the list defined by the user. Alert three, a signal from the door knock sensor on the front door, will not make it to the puck because the user added a clock filter and the time of the knock was after the allowed time set in the filter. Alert four, a Twitter post about a local high school fire does make the puck vibrate because of the hashtag # fire. Text messages arrive at the smart device, and the notifications in the smart device signal the alerting software to analyze the incoming message, call, or email based on the filters that have been set. If preset conditions are met, then the software triggers the puck to flash or vibrate.

Additionally the system is able to analyze signals from the onboard sensors of the puck and from other connected sensors to determine the type of sounds present in the room where the puck or sensor is located. Preferably the system includes a proprietary library of signals that characterize typical sounds such as voices, glass breaking, door knocking, banging, falling, screams, water noises and cross references the noise with the location of the sensor or puck to display to the user an alert and location of the alert. Additionally the system characterizes the output of a pressure sensor and accelerometer located on the puck to determine whether the user has awoken and rose from slumber in response to alerts from the puck.

System 801 further comprises an emergency mode wherein the functionality of the system is modified in response to an emergency. The user can designate any given alert as an emergency alert category. Thereby automatically setting the vibration resulting from the alert to a predetermined strength and pattern, while changing the color of the LED's to a predetermined pattern and or color.

The system helps users inundated with repetitive notices focus on critical alerts. For example, the system can be configured to filter out repetitive alerts until a second alert or action is completed. For example, a user may set the system to ignore a door knock sensor until a text message from a food delivery provider has been received by the system.

Additionally the system is able to be integrated with home network devices that are capable of providing alerts such as text messages, data messages across a shared computer network, or Wi-Fi network. For example, an improved thermostat sending a text message to a user about the sudden drop in temperature of the upstairs bedroom can drive the system to activate the puck. Therapeutic devices, such as insulin pumps, provide notifications to users through weak audible notifications and possible text messages. The system is able to monitor and relay critical alerts to users from Therapeutic devices. Alerts from Therapeutic devices can be flagged or grouped, to not be filtered by the system, because of the potential critical nature of alerts from Therapeutic devices.

It should be apparent that the system alternatively comprises an application programming interface, or API, enabling the application 301 on the smart device and the puck 101 to be in communication with external devices, such as cell phones, door knock sensors, smoke alarms, carbon monoxide detectors, alarm clocks, music players, home automation controllers and base stations, window sensors, door-open sensors, smart lighting, emergency pendants, and more, from a variety of manufacturers. This proprietary API will allow third-party manufacturers to communicate with and control the application 301 and the puck 101, and for the application 301 and the puck 101 to control devices made by third-party manufacturers.

Figure 9A:
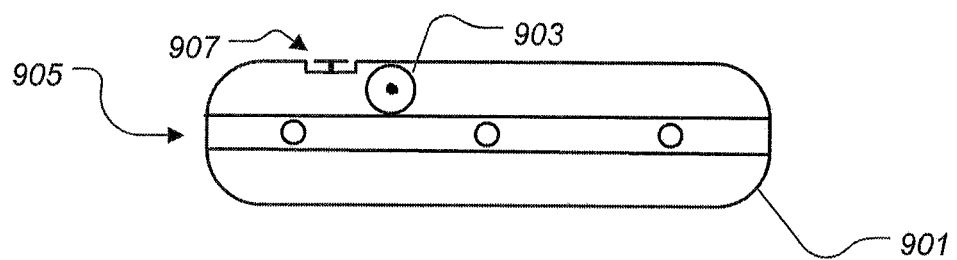
FIG. 9A is a side view of an alternative embodiment of an alerting apparatus according to the present application.
Figure 9B:
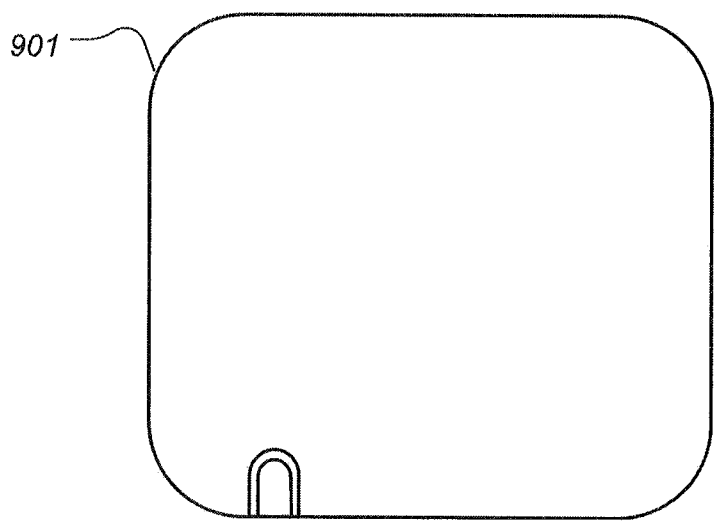
FIG. 9B is a top view of a preferred embodiment of an alerting apparatus according to the present application.
Figure 9C:
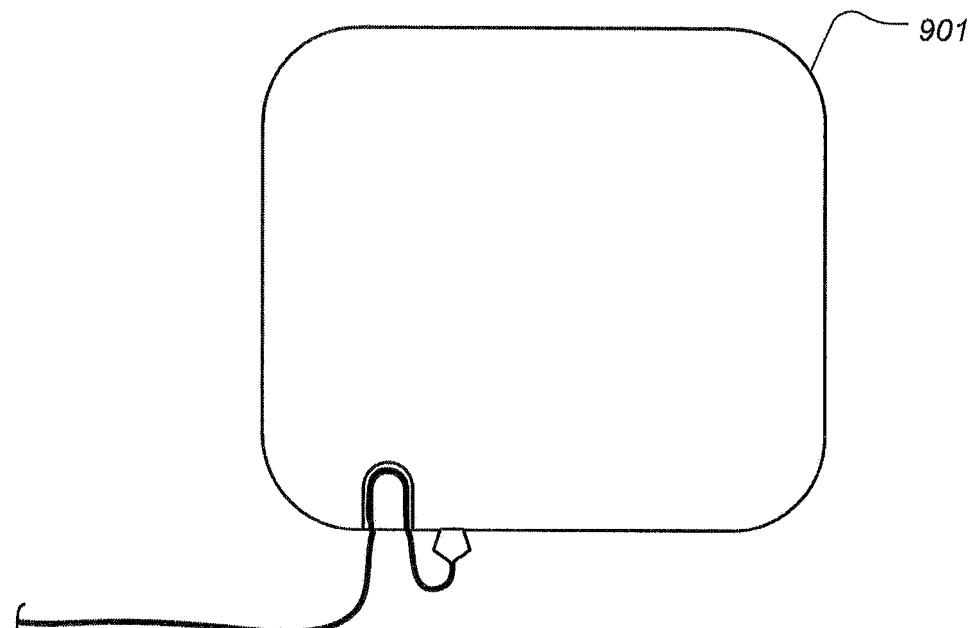
FIG. 9C is a top view of a preferred embodiment of an alerting apparatus with a retained charging cord according to the present application.

Referring now also to FIGS. 9A, 9B, and 9C in the drawings, alternative embodiment of an apparatus 901 for alerting a user according to the present application are illustrated. Puck 901 is similar to puck 101 with the similar battery, similar sensors, similar communication system, and similar controller with memory. Puck 901 in contrast to the puck 101 is designed to be a smaller unit than puck 101. Furthermore, the battery of puck 901 is charged by a plug 903 located on the puck 901. An alternative embodiment utilizes a display located on the puck 901 to facilitate the user programming the puck directly.

Puck 901 includes a plurality of light emitting diodes (LED) 905 clusters arranged around the outside edge of the puck. Typically, each LED cluster 905 is comprised of three individual LED each with their own color. Typically, there is a red, green, and blue LED closely packed into a single LED cluster 905. Having the ability for the puck 901 to individually control each color of each LED cluster 905 allows the puck to produce a variety of optical patterns of various colors in response to various events. For example, the more important the event, the brighter the intensity of the LED's 905. Additionally, the pattern of lights can be made to match the pattern of vibrations from the puck 901. The pattern of vibrations reflected in the matching pattern of lights will allow the user to recognize, both visually and physically, the source of the noise whether it is a rapid knocking on the door, the repeated pattern of a siren etc.

Puck 901 further comprises a channel 907 that starts and ends on an edge of the puck. Channel 907 is configured to retain a charging cord that electrically connects puck 901 to a power supply through plug 903. Channel 907 prevents charging cord from inadvertently being electrically disconnected from the puck. Maintaining an electrical connection is critical to vibrate the user by the puck in response to alerts and emergency notifications. Other assemblies are contemplated to maintain the electrical connection such as a tether, integrated wiring, and a bayonet style electrical plug. The channel is preferred because the user can decide when to utilize the channel. In the preferred embodiment only power is supplied to the puck through the plug 903 while control of the puck 901 is through the smart device. Alternatively the puck receives power and communications through plug 903.

Figure 10:
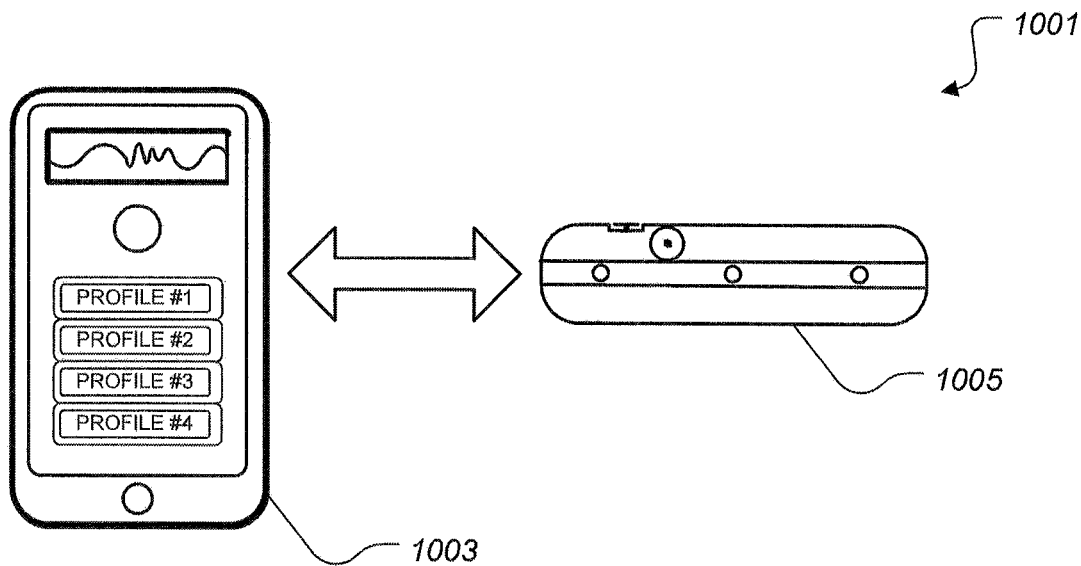
FIG. 10 is a flow chart of an alternative embodiment of an alerting system with multiple profiles according to the present application.

Referring now also to FIG. 10 in the drawings, an alternative embodiment of a system for alerting a user having a single puck, a single smartdevice, and multiple profiles according to the present application is illustrated. System 1001 is comprised of a first smartdevice 1003 in wireless communication with puck 1005. As shown, the software application is programmed to be executed on a smartdevice 1003, however it should be apparent that other devices such as tablets, computers, smart televisions, smart watches, and other smart devices like wi-fi/Bluetooth enabled clock and other notifications systems, visual notification systems, and such that are able to be paired with the puck 1005 and be interfaced with it. Smartdevice allows multiple users the ability to selectively activate the puck based on filtering of all notifications and alerts that the smartdevice receives. The user can create multiple alert filters, some emergency designated filters along with non-emergency designated filters, and store them in a variety of profiles on the smartdevice with each filter having a separate color associated with the filter that the smartdevice and puck utilize to indicate to the user the specific filter was activated. Each profile utilizes a separate icon on the display of the smartdevice. For example, a tsunami warning issued for the user's zip code could activate a blue and white light pattern with matching vibrations to alert the user of the tsunami warning in that zip code. Additionally, the system allows users to create filters that designate certain notifications as emergency notifications based upon the user defined filters stored in the profiles. For example, a highly allergic deaf user can be notified that the air pollen level outside is severe as an emergency alert based on their filter when receiving the local air condition notification, whereas other users would not assign the air pollen level to be an emergency alert because they are not highly allergic to pollen.

Smartdevice 1003 contains a plurality of profiles for the puck 1005. For example, profile 1 can be configured to process all notifications from the smart device to vibrate the puck. Profile 2 can be configured to process some filtered notifications from the smart device to vibrate the puck and all emergency notifications to vibrate the puck. Whereas, profile 3 can be configured to process only emergency notifications from the smart device to vibrate the puck such as tornado and earthquake warnings. The user of the system configures each profile to their selected configuration and then is able to choose which profile the system utilizes to selectively activate the puck 1005. The user choose which vibration pattern they want associated with each alert and whether they want the lights of the puck to also activate. For example, the user might want maximum vibration and red lights in response to a fire alarm and a see saw pattern of vibration and green lights in response to a knock at the door.

Smartdevice 1003 is configured to activate a diagnostic mode of the system 1001. In the diagnostic mode, the various elements of the system are systematically activated for the user to verify function. For example, all the lighting elements on the puck are activated to allow the user to see if they all are operational. The smartdevice detects which firmware the puck is operating on and displays that information to the user on the screen. Alternatively, the puck utilizes built in sensors to determine diagnostic functionality and relay that back to the smartdevice. For example, the accelerometer can be utilized to check functionality of the puck's vibration system. Also, light sensitive transistors can be co-located with the light emitting diodes to allow the system to verify optical emissions.

System 1001 also is configured to allow the user to whitelist the settings on the smartdevice 1003 for the application, thereby changing the configuration of the smartdevice's running of the application quickly and easily. The application provides the user with instructions based on the type of smartdevice to modify settings of the smartdevice only configurable from the user to enable the application to run in a preferred mode. Whitelisting the application provides the user control whether the smartdevice allows the application to go dormant in certain situations. For example, if the user's application for their washer was whitelisted then even if the application hasn't been used in months and starts to leak water as detected by the washer the smartdevice would receive the notification because the application was whitelisted.

System 1001 is also configured to allow smartdevice 1003 to activate the vibration system of the puck 1005 by depressing a button on the display of the smartdevice without an alert or message incoming to the smartdevice. For example, the user can depress the button and activate the smartdevice to alert their children that breakfast is ready and to get out of bed. System 1001 is configured to connect the puck and the smart device Internet of Things via chip, API, cloud based servers and integration with smart virtual assistants and Real Time Text.

Figure 11:
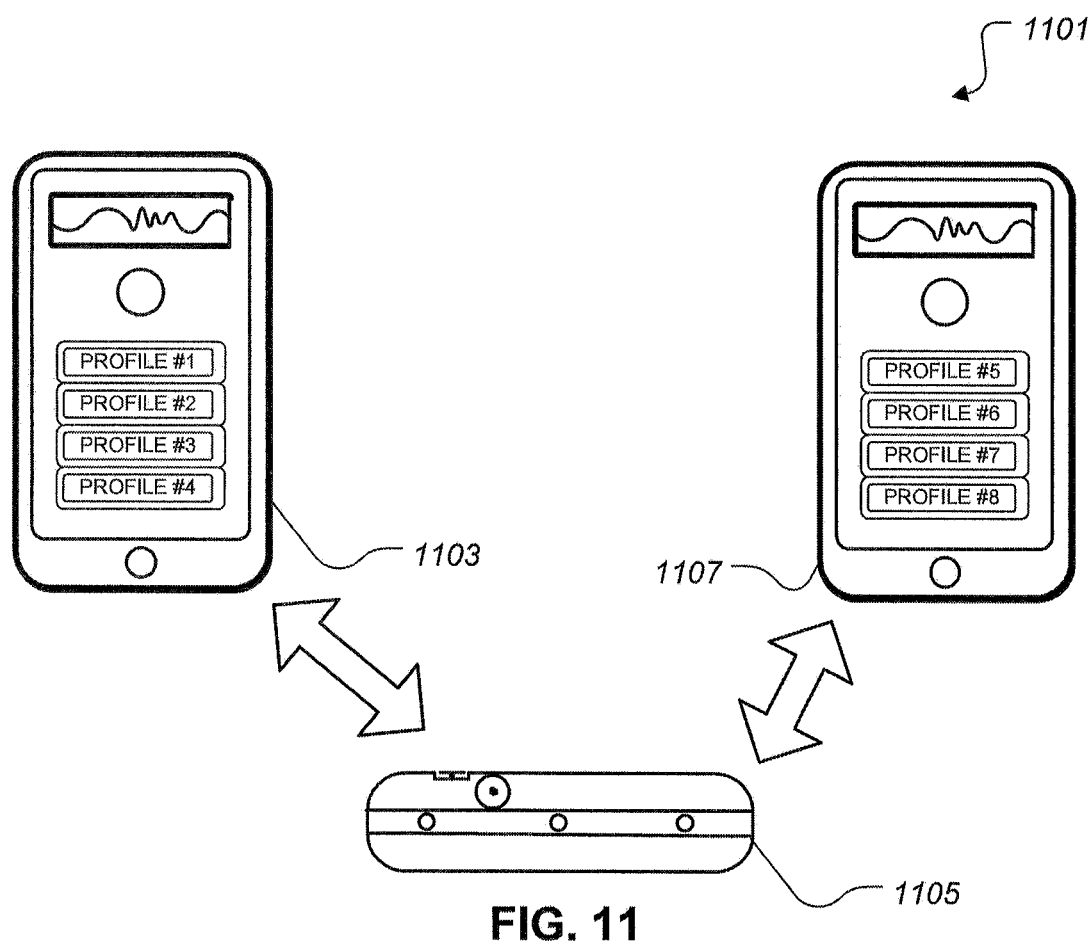
FIG. 11 is a flow chart of an alternative embodiment of an alerting system with multiple profiles and multiple users according to the present application.

Referring now also to FIG. 11 in the drawings, an alternative embodiment of a system for alerting a user having a single puck, dual smartdevices, and multiple profiles according to the present application is illustrated. System 1101 is comprised of a first smartdevice 1103 in wireless communication with puck 1105 and a second smartdevice 1107 in wireless communication with puck 1105. Both smartdevices 1103 1107 contain a plurality of profiles for the puck 1105. For example, profile 1 can be configured to process all notifications from the smart device to vibrate the puck. Profile 2 can be configured to process some filtered notifications from the smart device to vibrate the puck and all emergency notifications to vibrate the puck. Whereas, profile 3 can be configured to process only emergency notifications from the smart device to vibrate the puck such as tornado and earthquake warnings. The user of the system configures each profile to their selected configuration and then is able to choose which profile the system utilizes to selectively activate the puck 1105.

System 1101 allows dual control of the puck from two smartdevices. Therefore, for example both parents of a child can control puck 1105 located near their sleeping child to alert them to awake or to seek help. Mother's smartdevice 1103 may be configured to vibrate puck when the local weather's social media account utilizes the term "TORNADO." Father's smartdevice 1107 may be configured to vibrate puck when FEMA sends an earthquake warning. Since the puck will respond to either smartdevice, each parent can be assured their specific monitored alert will be relayed to the puck as needed. Since two smartdevices are being utilized the system is provided with a redundant connection to the internet from the second smartdevice.

Figure 12:
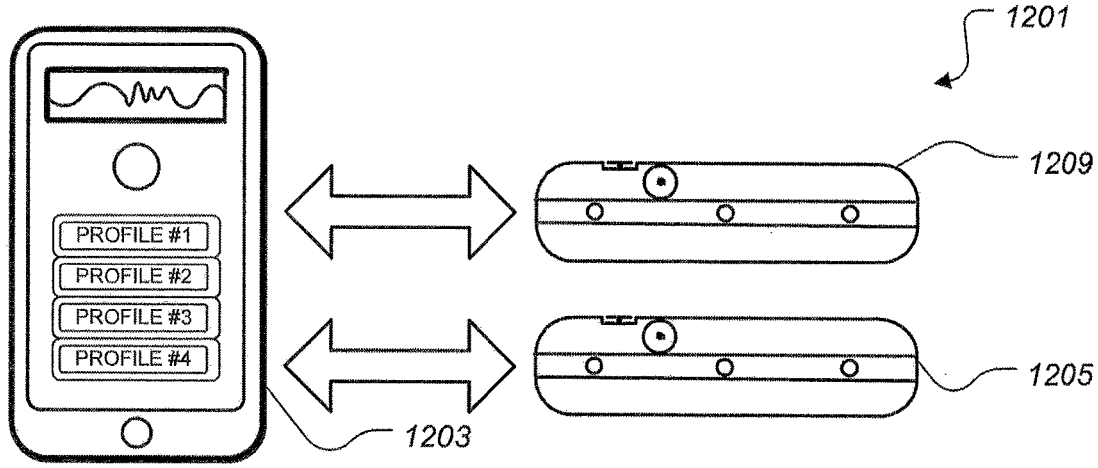
FIG. 12 is a flow chart of an alternative embodiment of an alerting system with multiple profiles and multiple pucks according to the present application.

Referring now also to FIG. 12 in the drawings, an alternative embodiment of a system for alerting a user having dual pucks, a single smartdevice, and multiple profiles according to the present application is illustrated. System 1201 is comprised of a first smartdevice 1203 in wireless communication with first puck 1205 and second puck 1209. Smartdevice 1203 contains a plurality of profiles for the first puck 1205 and second puck 1209. For example, profile 1 can be configured to process all notifications from the smart device to vibrate the first puck. Profile 2 can be configured to process some filtered notifications from the smart device to vibrate the first puck and all emergency notifications to vibrate both pucks. Whereas, profile 3 can be configured to process only emergency notifications from the smart device to vibrate both pucks such as flood and fire alarms. The user of the system configures each profile to their selected configuration and then is able to choose which profile the system utilizes to selectively activate either the first puck 1205, the second puck 1209, or both pucks.

Figure 13:
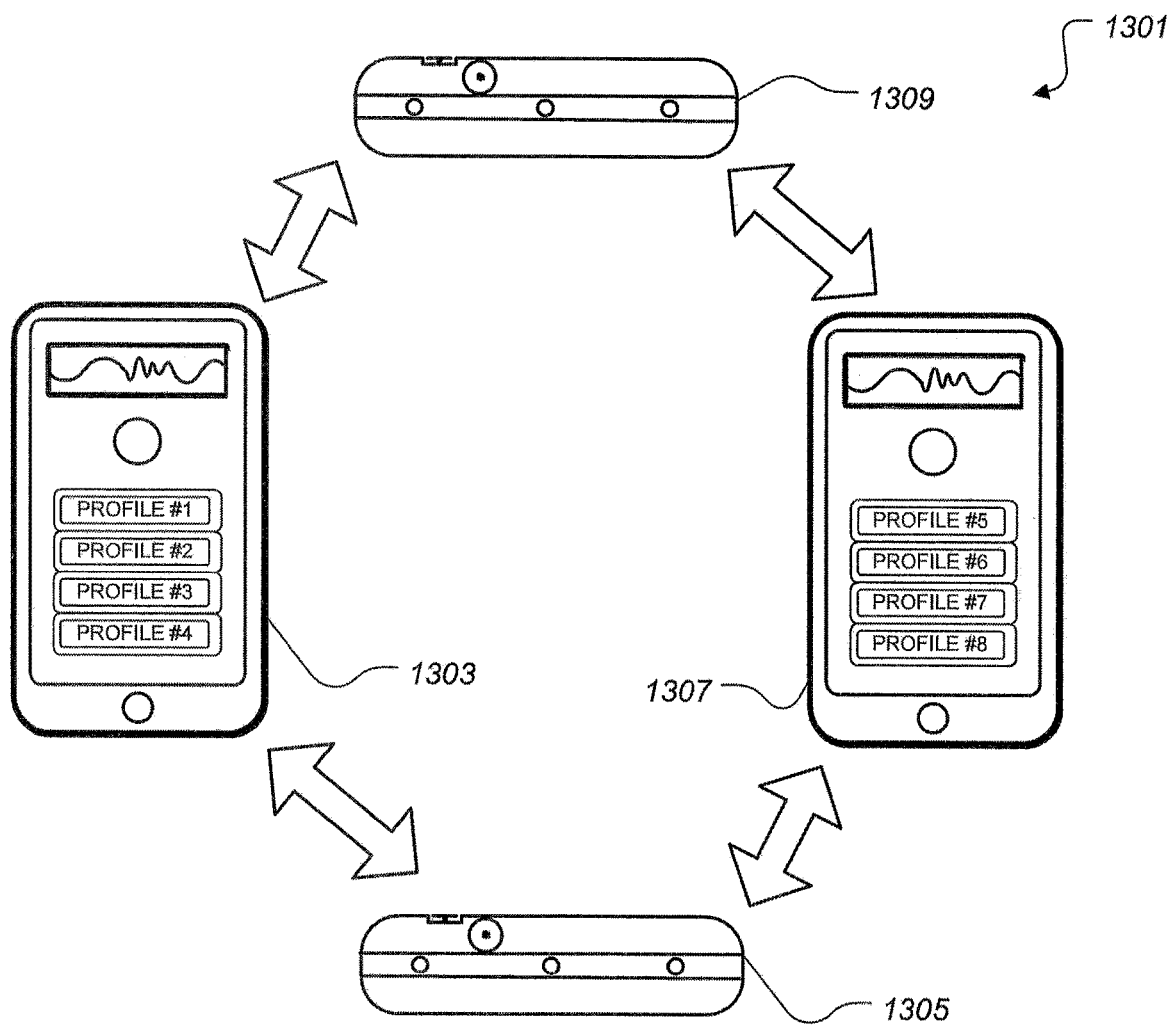
FIG. 13 is a flow chart of an alternative embodiment of an alerting system with multiple profiles, multiple pucks, and multiple users according to the present application.

Referring now also to FIG. 13 in the drawings, an alternative embodiment of a system for alerting a user having dual pucks, dual smartdevices, and multiple profiles according to the present application is illustrated. System 1301 is comprised of a first smartdevice 1303 in wireless communication with pucks 1305 1309 and a second smartdevice 1307 in wireless communication with pucks 1305 1309. Both smartdevices 1303 1307 contain a plurality of profiles for the pucks 1305 1309. For example, profile 1 can be configured to process all notifications from the smart device to vibrate the puck 1305. Profile 2 can be configured to process some filtered notifications from the smart device to vibrate the puck 1305 and all emergency notifications to vibrate the puck 1309. Whereas, profile 3 can be configured to process only emergency notifications from the smart device to vibrate the puck 1305 such as tornado and earthquake warnings. The user of the system configures each profile to their selected configuration and then is able to choose which profile the system utilizes to selectively activate the pucks 1305 1309.

System 1301 allows dual control of the pucks from two smartdevices. Therefore, for example both parents of two children can control pucks 1305 1309 located near their sleeping children to alert them to awake or to seek help. For example, puck 1305 can be located near the daughter sleeping in the bedroom and puck 1309 can be located near the sleeping son in the basement. Mother's smartdevice 1303 may be configured to vibrate pucks 1305 1309 when the local weather's social media account utilizes the term "TORNADO." Father's smartdevice 1307 may be configured to vibrate pucks 1305 1309 when FEMA sends an earthquake warning. Since the pucks will respond to either smartdevice, each parent can be assured their specific monitored alert will be relayed to the pucks as needed. Since two smartdevices are being utilized the system is provided with a redundant connection to the internet from the second smartdevice.

Figure 14:
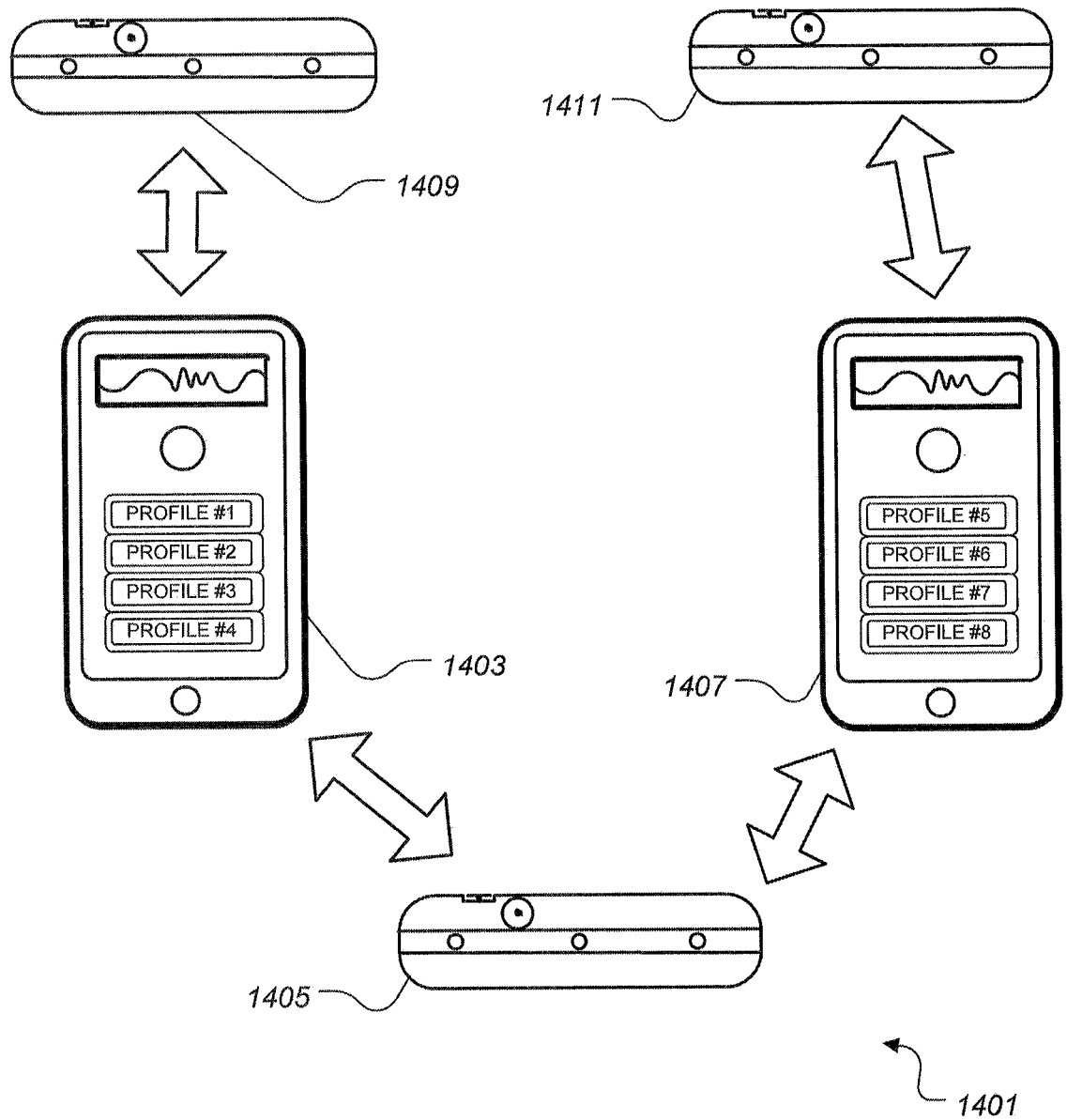
FIG. 14 is a flow chart of an alternative embodiment of an alerting system with multiple profiles and multiple pucks according to the present application.

Referring now also to FIG. 14 in the drawings, an alternative embodiment of a system for alerting a user having three pucks, dual smartdevices, and multiple profiles according to the present application is illustrated. System 1401 is comprised of a first smartdevice 1403 in wireless communication with a first puck 1405, a second puck 1409 and a second smartdevice 1407 in wireless communication with the first pucks 1405 and a third puck 1411. Both smartdevices 1403 1407 contain a plurality of profiles for the pucks. For example, profile 1 can be configured to process all notifications from the smart device to vibrate the first puck 1405. Profile 2 can be configured to process some filtered notifications from the smart device to vibrate the first puck 1405 and all emergency notifications to vibrate the second puck 1409. Whereas, profile 3 can be configured to process only emergency notifications from the smart device to vibrate the first puck 1405 such as air raid and tsunami warnings. The user of the system configures each profile to their selected configuration and then is able to choose which profile the system utilizes to selectively activate the pucks.

System 1401 allows dual control of the first puck 1405 from two smartdevices. Second puck 1409 is only controllable from the first smartdevice 1403, and third puck 1411 is only controllable from the second smartdevice 1411. Each puck of the system is exclusively paired with a smartdevice or a plurality of smartdevice. The pairing is typically comprised of entering a code associated with each puck into the smartdevice to limit authority to the puck. Alternatively, the puck can be paired by the puck emitting a vibratory or illuminated pattern to be detected by the smartdevice and pair them together. Pairing of the devices is important to prevent non-authorized users from activating or disabling the puck.

In certain situations the radio is not accessible and/or users are not being able to check the notifications on their smart device due to driving laws and mobile phone designs that block checking of texts when one is driving. Furthermore, texts that come through to the car conventionally via Bluetooth are all treated the same way. The system in an alternative embodiment replaces the puck or supplements the puck with an improved vehicle having an automobile information system. For example, the user's smartdevice is connected to the user's vehicle and the filtered notification is sent to a display of the vehicle for the user to be notified of traffic in a few miles down the road or of an active shooter located in the zip code where the smartdevice is located in place of vibrating a puck or in addition to vibrating a puck.

Furthermore, the system is configured to utilize artificial intelligence to selectively create and operate filters. For example, as more and more external notifications are relayed to the smartdevice, it becomes harder for the user to define each and every filter to limit unwanted notifications from activating the puck and allowing critical notifications to activate the puck. Virtual personal assistants located remote from the smartdevice can adaptively formulate and modify the filters based upon the user's preference. For example, user one might send and receive text messages from user two and has a filter only allowing text messages from user two to activate the puck. The artificial intelligence system can detect an incoming call from user two and activate the puck, thereby modifying the user selected filter.

The systems and methods described above provide several distinct advantages over previous alerting systems. Typical users of this system are those that are deaf, hard of hearing, and/or blind; and they obtain advantages from the extra sensory information from the lights and vibrations to notify people whether they are deaf, blind, both, or neither. Furthermore no specific information beyond the current systems of wired phones and doorbell notifications is provided to users. Current home automated systems—are all limited to textual messages that are not currently filtered. The system provides a user with a convenient alerting system that provides feedback to the system and is aware of the conditions in the environment surrounding the user of the puck, and the information being received in real time into the smartphone/computer/tablet control device. The system provides the user with a method of customizing the type of alert. Additionally, the system can customize the alerts and the various ways of notifying the user of an alert as it is triggered to each specific user. The puck in combination with the smart device and software allows users to combine several independent alerting systems into a unified system providing one interface for many different types of emergency and non-emergency alerts. Additionally, the system provides users with the ability to parse RTT encoded transmissions having simultaneous text and voice in the same transmission or call. For example, a user can be notified via the puck that a call is incoming to their phone with both text and voice components without being in close proximity to their cell phone.

The invention claimed is:

1. A system for selectively alerting users, comprising:
    a server; and
    a first puck, having:
        a vibration system configured to vibrate the first puck;
        a battery pack;
        a wireless system in electronic communication with the server;
        a controller; and
        a feedback loop system comprising:
            a feedback sensor; and
            a database of feedback sensor values;
        wherein the feedback sensor values stored in the database correspond to known environmental conditions;
        wherein the controller determines environmental conditions about the first puck by comparing feedback loop data from the feedback sensor against the database of feedback sensor values and adjust the vibration of the first puck in response to the environmental conditions determined about the first puck.

2. The system for selectively alerting users according to claim 1, further comprising:
    a first smart device;
    wherein the first smart device is in electronic communication with the server and the wireless system of the first puck.

3. The system for selectively alerting users according to claim 1, the first puck further having:
    a channel located on a surface of the first puck configured for retaining a removable power cord plugged into the first puck.

4. The system for selectively alerting users according to claim 2, the first smart device comprising:
    a first filter based on a first condition, the first filter located on the first smart device for selectively activating the vibration system of the first puck.

5. The system for selectively alerting users according to claim 4, wherein the first condition is based on a keyword match associated from a first alert external to the first smart device.

6. The system for selectively alerting users according to claim 2, wherein the first smart device is configured for allowing a first user to input a first alert and a second user to input a second alert and selecting a first vibratory pattern in response to the first alert and selecting a second vibratory pattern in response to the second alert.

7. A method for selectively alerting users, comprising:
    providing a first puck having a vibration system, a feedback sensor, and a database of feedback sensor values corresponding to known environmental conditions;
    providing a first smart device;
    creating a first filter having at least a first condition on the first smart device for selectively activating the vibration system of the first puck;
    receiving a first alert externally from the first smart device;
    applying the first filter to the first alert;
    activating the vibration system of the first puck if the first condition of the first filter is met;
    ignoring the first alert if the first condition of the first filter is not met;
    determining environmental conditions about the first puck by comparing feedback loop data from the feedback sensor against the database of feedback sensor values; and
    adjusting the vibration of the first puck in response to the environmental conditions determined about the first puck.

8. The method for selectively alerting users according to claim 7, wherein the first condition is based on a keyword match associated from an external alert.

9. The method for selectively alerting users according to claim 7, the first filter further having:
    a second condition;
    wherein the first condition is based on a keyword match associated from an external alert.

10. The method for selectively alerting users according to claim 7, further comprising:
    assigning a first vibration pattern to the first filter;
    assigning a first lighting pattern to the first filter; and
    flashing a plurality of lighting elements on the first puck based on the first lighting pattern if the first condition of the first filter is met;
    wherein activating the vibration system is based on the first vibration pattern.

11. The method for selectively alerting users according to claim 7, further comprising:
    creating a list of contacts on the first smart device;
    creating a second filter to limit alerts external to the first smart device based upon the list of contacts; and
    ignoring the first alert if a sender of the first alert is not on the list of contacts.

12. The method for selectively alerting users according to claim 7, further comprising:
creating the first vibration pattern on the first smart device.

13. The method for selectively alerting users according to claim 7, further comprising:
providing an external lighting element; and
activating the external lighting element in unison with the vibration system if the first condition of the first filter is met.

14. The method for selectively alerting users according to claim 7, further comprising:
creating a first user profile;
creating a second user profile;
assigning the first filter to at least one of the first user profile and the second user profile; and
selecting either the first user profile or the second user profile.

15. A system for alerting users, comprising:
a first puck, having;
a vibration system configured to vibrate the first puck;
a battery;
a wireless system;
a controller; and
a feedback loop system comprising:
a feedback sensor; and
a database of feedback sensor values;
wherein the feedback sensor values stored in the database correspond to known environmental conditions;
wherein the controller determines environmental conditions about the first puck by comparing feedback loop data from the feedback sensor against the database of feedback sensor values and adjust the vibration of the first puck in response to the environmental conditions determined about the first puck;
a second puck, having;
a vibration system configured to vibrate the second puck;
a battery; and
a wireless system; and
a first smart device configured for selectively limiting alerts to the first smart device to vibrate at least one of the first puck or the second puck.

16. The system for alerting users according to claim 15, the first puck further having:
a channel located on a surface of the first puck configured for retaining a removable power cord plugged into the first puck to maintain power to the battery of the first puck.

17. The system for alerting users according to claim 15, the first smart device further having:
a first filter based on a first condition, the first filter located on the first smart device for selectively activating the vibration system of the first puck.

18. The system for alerting users according to claim 17, wherein the first condition is based on a keyword match associated from an alert external to the smart device.

19. The system for alerting users according to claim 15, further comprising:
an external sensor, having;
a wireless system;
wherein the first smart device is configured to receive notifications from the external sensor across the wireless system of the external sensor.

20. The system for alerting users according to claim 15, further comprising:
a server;
wherein the server stores alerts to at least one of the first puck and the second puck.

\* \* \* \* \*